US007079627B2

(12) United States Patent
Crago et al.

(10) Patent No.: US 7,079,627 B2
(45) Date of Patent: Jul. 18, 2006

(54) EMERGENCY CALL HANDLING IN A VOICE-OVER-PACKET ENVIRONMENT

(75) Inventors: William B Crago, Stouffville (CA); Hakem M Habib, Oshawa (CA); Marie Berthe Barbara Wilkes, Orleans (CA); Bernard Brabant, St-Lazare-de-Vaudreuil (CA); Guy Caron, St-Augustin-de-Desmaures (CA)

(73) Assignee: BCE Inc., Montreal (CA)

( * ) Notice: Subject to any disclaimer, the term of this patent is extended or adjusted under 35 U.S.C. 154(b) by 0 days.

(21) Appl. No.: 10/986,365

(22) Filed: Nov. 12, 2004

(65) Prior Publication Data

US 2006/0078095 A1  Apr. 13, 2006

Related U.S. Application Data

(60) Provisional application No. 60/617,656, filed on Oct. 13, 2004.

(51) Int. Cl.
*H04M 11/04* (2006.01)
(52) U.S. Cl. .......................................... 379/45; 370/352
(58) Field of Classification Search .................. 379/45, 379/37–40, 90.01; 370/352
See application file for complete search history.

(56) References Cited

U.S. PATENT DOCUMENTS

| 6,678,357 | B1 * | 1/2004 | Stumer et al. ................. 379/45 |
| 6,771,742 | B1 | 8/2004 | McCalmont et al. |
| 6,940,950 | B1 * | 9/2005 | Dickinson et al. ............ 379/45 |
| 2003/0211839 | A1 | 11/2003 | Baum et al. |
| 2004/0057425 | A1 | 3/2004 | Brouwer et al. |
| 2005/0063519 | A1 * | 3/2005 | James .......................... 379/45 |
| 2005/0175166 | A1 * | 8/2005 | Welenson et al. ............. 379/45 |
| 2005/0190892 | A1 * | 9/2005 | Dawson et al. ................ 379/45 |

FOREIGN PATENT DOCUMENTS

WO PCT/CA2005/001459 1/2006

OTHER PUBLICATIONS

IWCE; MRT; Nortel Proposes VoIP 911 Solution by Donny Jackson; Mobile Radio Technology, May 1, 2004 downloaded from: http://www.iwce-mrt.com/microsites/magazinearticle.asp?mode=print&magazinearticleid=198447&releaseid; 1 page.

(Continued)

*Primary Examiner*—Stella Woo

(57) ABSTRACT

A method of routing an emergency call received at a network element. The method comprises determining a directory number associated with a communication device having originated the emergency call, consulting a local database to obtain routing information associated with the directory number, and directing the call and the routing information over a path dedicated to emergency calls. Also, a network element which comprises the database as well as a control entity, the control entity being operative for receiving an incoming call originated by one of the communication devices, determining the directory number associated with the communication device having originated the call, determining whether the call is an emergency call and, responsive to the call being an emergency call, accessing the database to obtain the routing information related to the directory number and directing the call as well as the routing information over a trunk group dedicated to emergency calls.

25 Claims, 20 Drawing Sheets

OTHER PUBLICATIONS

PACKET8; Communication for the broadband Generation; Packet8 Offers The Safest VoIP E911 Service Available Today; downloaded from: http://www.packet8.net/about/e911.asp; 1 page.

911 Services: Wireline, Wireless and VoIP; IRT; Prof. Henning Schlzrinne; Dept. of Computer Science; Columbia University, New York; FCC Solutions Summit; Mar. 18, 2004; (18 pages).

Communications ASP Magazine—Roundup; Jan./Feb. 2001; Softswitches And Application Servers; downloaded from: http://www.tmcnet.com/casp/0101/0101rup.htm; on Aug. 19, 2004; (pp. 1-10).

This Is an Emergency—911 is a joke for VoIP customers; by Ben Smith; posted on Sep. 8, 2004; downloaded from: http://www.slate.msn.com/id/2106424/; (pp. 1-3).

Press Release; ATIS to Work with Intrado to Standardize Next Generation 9-1-1 Messaging Protocols; Source: Intrado; Aug. 9, 2004; Innovative Messaging Protocol Advances 9-1-1 Capability; (3 pages).

8*8 Announces First enhanced 911 (E911) Service for Residential Voice Over IP (VoIP); Yahoo Financial News; downloaded from: http://www.biz.yahoo.com/prnews/040614/nym072a__1.html; Aug. 17, 2004; (pp. 1-3).

DISPATCH Monthly; Voice Over Internet Protocol (VoIP) & 911; downloaded from: http://www.911dispatch.com/information/voip.html.; Aug. 17, 2004; (pp. 1-2).

VONAGE (The Broadband Phone Company); 911 Dialing; Vonage Lets You Dial 911; downloaded from: http://www.vonage.com/features.php?feature=911; Aug. 17, 2004; (pp. 1-2).

Nortel Networks; Product Brief; Voice Over IP Solutions; Succession Communication Server 2000;(www.nortelnetworks.com); 4 pages.

The Superclass Softswitch; What service providers require from day one to deploy VoIP in their core networks; Nortel Networks; Business Without Boundaries; (pp. 1-12).

Product Brief; Nortel Networks Succession Release 3.0; 5 Compelling Reasons to Upgrade Your Meridian 1 to Succession 3.0; ; Nortel Networks; Business Without Boundaries; (4 pages).

HBF; HBF i-911 VoIP Interim Solution; (pp. 1-5).

Solution Overview; Nortel Networks; Succession Communication Server for Enterprise 1000; (pp. 1-8).

BCR Best-In-Test; Large IP-PBXs: A Well-matched Quartet; by Betsy Yocom, Jonathna Taylor, Diane Poletti-Metzel and Randy Birdsall; Business Communications Review; as early as Jan. 2004; (pp. 26-31 & pp. 35-40).

Cisco Systems; Hosted Business, IP Telephony; (pp. 1-52).

Nortel Networks; Multimedia Communications Portfolio; Multimedia Communication Server 5200; Leverage the innovation of the Internet to deliver voice, data, and video as new converged multimedia services; (4 pages).

* cited by examiner

178 {

| DIRECTORY NUMBER N | ROUTING KEY 214 | |
|---|---|---|
| | GATEWAY IDENTIFIER 214A | ROUTING CODE 214B |
| 555-123-4567 | XYZ | ABC |
| 555-765-4321 | WYZ | CBD |

| DIRECTORY NUMBER N | EM ZONE 210 | ROUTING KEY 214 | |
|---|---|---|---|
| | | GATEWAY IDENTIFIER 214A | ROUTING CODE 214B |
| 555-123-4567 | EM1 | XYZ | ABC |
| 555-765-4321 | EM5 | WYZ | CBD |

FIG. 3B

EMERGENCY CALL HANDLING IN A VOICE-OVER-PACKET ENVIRONMENT

CROSS-REFERENCE TO RELATED APPLICATIONS

The present application claims the benefit under 35 U.S.C. 119(e) of Provisional U.S. Patent Application Ser. No. 60/617,656, to William Crago et al., filed on Oct. 13, 2004, hereby incorporated by reference herein.

FIELD OF THE INVENTION

The present invention relates to the field of telecommunications in general and, more specifically, to the delivery of emergency services to users of communication devices in a network that provides voice-over-packet services.

BACKGROUND

The current Emergency Services Enhanced 9-1-1 (E911) infrastructure in North America is based on a distribution of Primary Public Safety Answering Points (P-PSAPs, hereinafter referred to solely as PSAPs) accessible from the Public Switched Telephone Network (PSTN) via a special group of telephone lines dedicated solely to emergency use. The same applies to other emergency codes used in other parts of the world, e.g., E112 in continental Europe, E999 in England, etc.

In the current infrastructure, each individual telephone number is assigned a corresponding PSAP that is nearest to the physical location of the user of that telephone number. The physical location of the user is assessed on the basis of the area code and local exchange of the telephone number. When a user places an emergency call, the calling party's telephone number is transmitted with the call, and on the basis of the originating telephone number, the emergency call will be routed to the designated PSAP along one of the dedicated emergency lines. Upon receipt at the PSAP, the call is answered by a trained responder. By virtue of an automatic location identification (ALI) database which maps each telephone number to an address, the responder is able to obtain the physical location of the calling party and dispatch a police officer, firefighter or ambulance as necessary.

With the advent of the Internet, society has witnessed the expansion of a global packet-switched network into an ever increasing number of homes and businesses. This has put ever increasing numbers of users into contact with one another, usually at little cost for unlimited use. Meanwhile, advances have been made in delivering voice communication over packet networks, driven primarily by the cost advantage of placing long-distance calls over the Internet as opposed to the leased lines of the world's telcos. Technology dealing with the delivery of real-time voice calls over a packet-switched network is generally known as voice-over-packet or voice-over-Internet-Protocol (voice-over-IP), and often simply referred to as "VoIP".

From a purely technological standpoint, the successful deployment of VoIP has several challenges, typically related to latency and congestion. Still, despite these and other technical drawbacks, many consumers have opted to subscribe to VoIP services, motivated by significant cost savings in the area of long-distance calling. This has led to a trend, whereby some residential and business consumers have actually chosen to abandon their "basic" PSTN connection in favour of a VoIP connection, not only to satisfy their long distance requirements but also to conduct local, day-to-day telephony. One area where this shift to all-VoIP paradigm can be problematic for consumers (and VoIP service providers) is in the delivery of emergency services.

Specifically, the call delivery technology is fundamentally different for VoIP, and as a result, the dialing of 9-1-1 during a VoIP connection does not work today in the same way as for a basic PSTN connection. For example, VoIP users can select their own telephone numbers, which may comprise an "area code" and a "local exchange" that are unrelated to the physical location from which calls will be placed. If the VoIP user dials 9-1-1, the call may be directed to a PSAP located in a different part of the country, significantly reducing the value of the emergency services being provided.

Recognizing these defects, some VoIP service providers have enhanced their offerings in the area of emergency services. For example, there are consumer VoIP solutions which allow the transfer of a 9-1-1 call from the VoIP network to the nearest PSAP in accordance with level i1 of the service levels proposed by the National Emergency Number Association (NENA) and the Voice over the Net (VON) coalition.

However, in accordance with this and other i1-compliant solutions, emergency calls are not delivered via the dedicated emergency lines and trunks described above, but instead arrive at the nearest PSAP via the PSAP's ordinary, i.e., administrative, lines. Since many PSAPs are unprepared to handle calls over ordinary telephone lines, this creates a variety of problems, ranging from the low priority typically given to administrative calls, to the possibility of having an emergency call answered by improperly trained staff such as a receptionist or, worse still, by an auto-attendant during off-normal hours.

Against this background, it is clear that further improvements are needed in the delivery of emergency services to persons dialing 9-1-1 from a VoIP-enabled telephone or device.

SUMMARY OF THE INVENTION

A first broad aspect of the present invention seeks to provide a method of routing an emergency call received at a network element. The method comprises determining a directory number associated with a communication device having originated the emergency call, consulting a local database to obtain routing information associated with the directory number and directing the call and the routing information over a path dedicated to emergency calls.

According to another broad aspect, the present invention seeks to provide a network element for use in a network that provides voice-over-packet services to a plurality of communication devices, each of the communication devices being associated with a respective directory number. The network element comprises a database that relates routing keys to respective directory numbers and a control entity operative for receiving an incoming call originated by one of the communication devices, determining the directory number associated with the communication device having originated the call, determining whether the call is an emergency call and, responsive to the call being an emergency call, (i) accessing the database to obtain the routing key related to the directory number; and (ii) directing the call and the routing key obtained at (i) over a trunk group dedicated to emergency calls.

According to yet another broad aspect, the present invention seeks to provide a network architecture for providing voice-over-packet services to a plurality of communication devices, each of the communication devices being associated with a respective directory number. The network architecture comprises a packet switch, a gateway connected to the packet switch and connectable to a circuit-switched emergency network and a database that relates individual directory numbers to respective routing keys. The packet switch is operative for receiving an incoming emergency call from one of the communication devices, determining the directory number associated with the communication device having placed the emergency call, accessing the database to obtain the routing key related to the directory number determined in the previous step, and directing the emergency call, the associated directory number and the associated routing key towards the gateway.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 3A and 3B conceptually illustrate the contents of a table maintained by a network element forming part of the architecture of FIG. 1, in accordance with two specific embodiments of the present invention;

DETAILED DESCRIPTION OF THE EMBODIMENTS

Figure 1A:
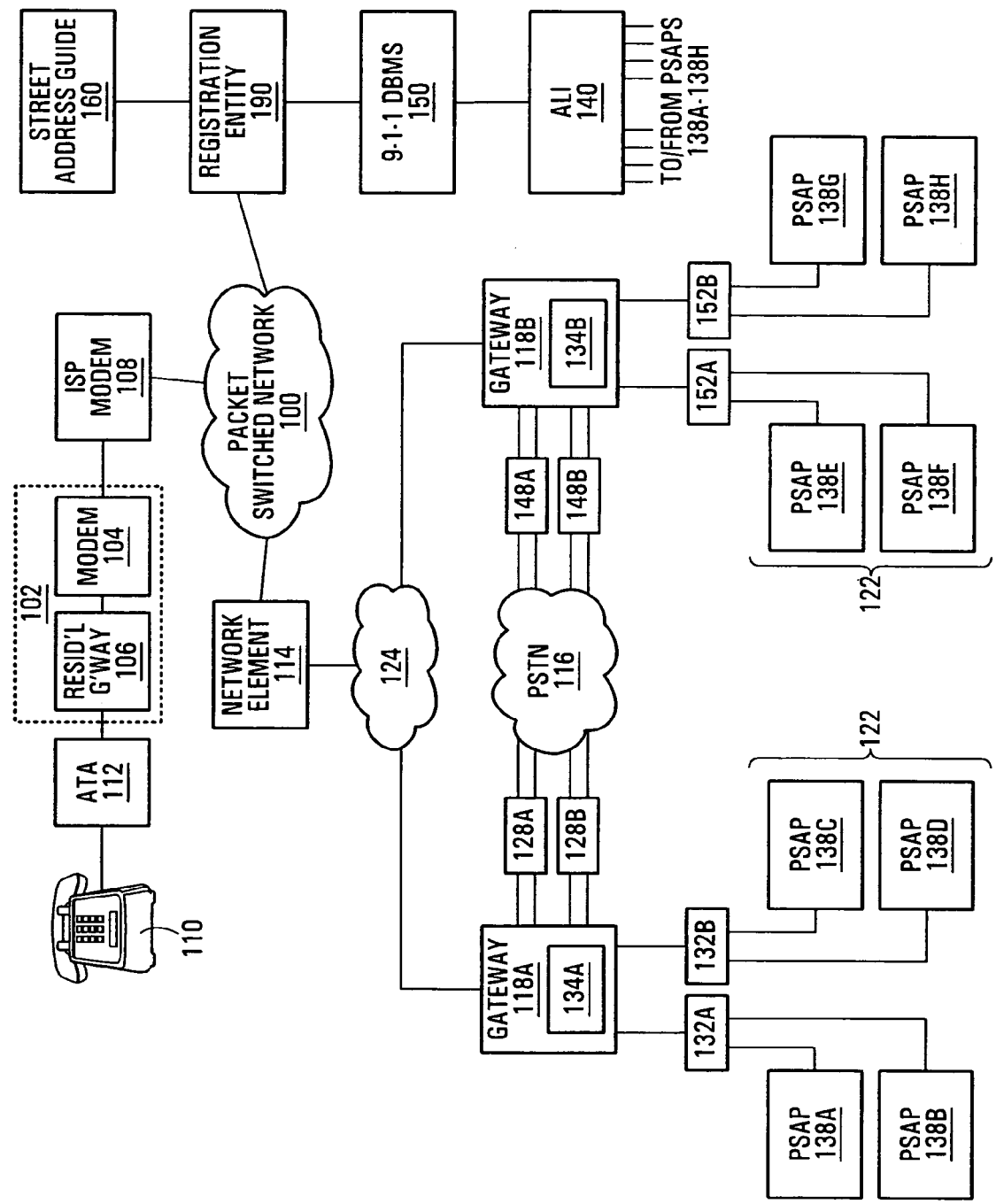
FIGS. 1A to 1C show in schematic form, various embodiments of an architecture of network elements suitable for the delivery of emergency services.

With reference to FIG. 1A, there is shown a network element architecture suitable for the delivery of emergency services in accordance with an embodiment of the present invention. A packet-switched network 100, which may or may not be the public Internet, comprises a backbone to which users have access via customer premises equipment 102 such as a modem 104 in combination with a residential gateway 106. In some embodiments, the modem 104 and the residential gateway 106 may be combined into a single unit at the customer premises.

A VoIP customer desirous of obtaining telephony services via the packet-switched network 100 may be provided with a special-purpose VoIP telephone or device that connects directly to the residential gateway 106. In another embodiment, and as illustrated in FIG. 1A, the VoIP customer utilizes a conventional analog telephone 110 which connects to the residential gateway 106 using an analog terminal adapter (ATA) 112. The ATA 112 permits the VoIP customer to re-use conventional telephony hardware in a VoIP environment, thus obviating the need to purchase and maintain a second telephone strictly for IP telephony purposes. Generally speaking, however, it is immaterial to the present invention whether the VoIP customer uses a special-purpose VoIP telephone or a conventional analog telephone 110 coupled to an ATA 112.

In a typical residential application, the packet-switched network 100 is accessed by the modem 104 in the customer premises equipment 102 upon establishing a connection to a modem 108 belonging to a network service provider, commonly an Internet service provider (ISP). The connection is made via an access infrastructure, examples of which include but are not limited to copper telephone lines (for an ADSL modem) 104 and coax cable (for a cable modem 104). It should be further understood that the present invention applies to the delivery of emergency services not only in a residential context but in other contexts such as business and corporate applications, where access to the packet-switched network 100 may be provided by a server that in some cases is directly connected to the packet-switched network 100.

A VoIP service provider maintains a registration entity 190, which VoIP customers may access via the packet network 100. In a non-limiting example of implementation, the registration entity 190 may be embodied as a server having a control entity and an I/O. Initially, potential VoIP customers contact the VoIP service provider via the registration entity 190. A given VoIP customer registers with the registration entity 190 and obtains a VoIP telephone number N (hereinafter referred to as a "directory number"). The VoIP customer, identified by the directory number N, can then begin to place calls into (and receive calls from) the packet-switched network 100. The registration entity 190 performs various other functions which will be described in further detail later on.

At the edge of the packet-switched network 100 there is provided a network element 114, which may be referred to as a packet switch or softswitch, and which comprises suitable circuitry, software and/or control logic for providing various communication services to VoIP customers. Examples of such communication services include but are not limited to call waiting, call forwarding, and so on. In addition, the network element 114 comprises suitable circuitry, software and/or control logic for exchanging calls with entities outside the packet-switched network 100. Where a call is placed by a VoIP customer, there are at least two circumstances that require the call to pass through the network element 114, namely, (i) a call placed to a telephone number that is reachable only via the Public Switched Telephone Network (PSTN) 116 and (ii) an emergency call.

In the former case, the network element 114 detects when a VoIP customer in the packet-switched network 100 is attempting to reach a destination that can only be reached via the PSTN 116, in which case the call is routed via a network 124 to one of a plurality of gateways 118A, 118B that connect to the PSTN 116.

In the latter case, the network element 114 detects when a VoIP customer in the packet-switched network 100 has dialed (either explicitly or via a speed dial function or in some other way) an emergency number such as "9-1-1". In such a case, the call, hereinafter referred to as an emergency call, is routed to one of the gateways 118A, 118B, which connect not only to the PSTN 116 as described above, but also to a network of dedicated emergency lines and Public Safety Answering Points (PSAPs), hereinafter collectively referred to as an E911 network 122.

In addition to the above, when handling an emergency call, the network element 114 comprises circuitry, software and/or control logic suitable for outpulsing a "routing key" associated with the directory number of the VoIP customer having placed the emergency call. The routing key accompanies the emergency call as it is routed by the network element 114 to the appropriate one of the gateways 118A, 1181B. Further detail regarding routing keys and the operation of the network element 114 will be given later on in this description.

In a specific example of implementation, the network element 114 is the Multimedia Communication Server 5200 from Nortel Networks Limited, Brampton, Ontario, Canada, although it should be understood that the present invention applies equally to other makes, models and types of packet switches or softswitches that have (or can be configured to have) the ability to assign a routing key to a VoIP customer's directory number.

As previously mentioned, the network element 114 is connected to the gateways 118A, 118B via the network 124. In some embodiments, the network 124 may be part of the packet-switched network 100 while in other embodiments it may not. In still other embodiments, rather than being connected via the network 124, the network element 114 may be connected to each gateway 118A, 118B by a respective communication link that can be optical fiber, coaxial cable, wireless, free-space optical, etc. It is noted that the network 124 (or the communication link(s), as the case may be) carries multiple telephone calls simultaneously. In an embodiment of the present invention, emergency calls are treated differently from non-emergency calls and therefore it is envisaged that distinct virtual trunk groups will be established for either type of call (non-emergency and emergency), as well as for each of the gateways 118A, 118B.

In addition to communicating with the network element 114 via the network 124, the gateways 118A, 118B in FIG. 1A also communicate with components of the PSTN 116 and the E911 network 122. Specifically, gateway 118A is connected to the PSTN 116 via a plurality of high-capacity switches 128A, 128B and is also connected to the E911 network 122 via a plurality of high-capacity switches 132A, 132B. Similarly, gateway 118B is connected to the PSTN 116 via a plurality of high-capacity switches 148A, 148B and is also connected to the E911 network 122 via a plurality of high-capacity switches 152A, 152B. It should be understood that the specific architecture shown in FIG. 1A is merely for purposes of illustration; in other architectures that are within the scope of the present invention, there may be more or fewer gateways, and not all gateways need be connected to both the PSTN 116 and the E911 network 122.

In a specific example of implementation, each or either of the gateways 118A, 118B may be embodied as the Communication Server 2000 from Nortel Networks Limited, Brampton, Ontario, Canada, although it should be understood that the present invention applies equally to other makes, models and types of gateways.

An example of a basic function of the gateways 118A, 118B is to allow non-emergency calls originated in the packet-switched network 100 to be completed via the PSTN 116 (which is circuit-switched) and vice versa. Another example of a basic function of the gateways 118A, 118B is to take emergency calls originated in the packet-switched network 100 and to route them into the E911 network 122, which is circuit-switched (much like the PSTN 116).

Continuing with the description of the architecture in FIG. 1A, switch 132A is connected via a first portion of the E911 network 122 to a first plurality of PSAPs, including PSAP 138A and PSAP 138B, while switch 132B is connected via a second portion of the E911 network 122 to a second plurality of PSAPs, including PSAP 138C and PSAP 138D. Similarly, switch 152A is connected via a third portion of the E911 network 122 to a third plurality of PSAPs, including PSAP 138E and PSAP 138F, while switch 152B is connected via a fourth portion of the E911 network 122 to a fourth plurality of PSAPs, including PSAP 138G and PSAP 138H. Of course, this distribution of PSAPs is not to be considered as limiting.

Each switch routes a received call in accordance with a connection map. For an emergency call received at a given one of the switches 132A, 132B, 152A and 152B, the call will specify a desired PSAP to be reached. The identity of the desired PSAP may be expressed in the form of a "E911 telephone number". Thus, for example, switch 132B will recognize an emergency call that has an associated "E911 telephone number" which specifies either PSAP 138C or PSAP 138D, and will route the emergency call accordingly. The E911 telephone number of may correspond to the telephone number of a specific PSAP along a dedicated in the E911 network 122, and is usually held confidential by the local exchange carrier.

In addition, switches 132A, 132B, 152A and 152B may have a further ability to forward an emergency call towards a specialized entity other than the PSAPs shown in the drawings. The desirability of doing so arises when a trained responder at a PSAP determines that a special agency (e.g., police, fire or ambulance) may need to be contacted. Forwarding of the emergency call may be done in accordance with a forwarding table that maps plural emergency telephone numbers to each directory number. Each emergency telephone number mapped to a given directory number is associated with a respective forwarding code that signifies either "police", "fire" or "ambulance". During an actual call received at a PSAP, a particular forwarding code would be applied by a trained responder at the PSAP in question and sent to switch 132B. Upon receipt of the particular forwarding code, switch 132B is operative to look up the directory number of the call in question and to forward the emergency call towards the appropriate agency using the emergency telephone number for the forwarding code in question. In practice, the trained responder may enter into a three-way conference before the call forward is complete.

It has already been mentioned that PSTN calls and emergency calls are received from the network 124 over different virtual trunk groups. This makes it a simple task for a particular one of the gateways 118A, 118B to determine towards which network (i.e., the PSTN 116 or the E911 network 122) to direct a given call. However, in the case of an emergency call received by, say, gateway 118A, there is still a question of whether to route the call towards switch 132A or towards switch 132B. To this end, gateway 118A maintains a connection map 134A which associates each potential received routing key with one of the switches, either switch 132A or switch 132B. In addition, gateway 118A may convert the routing key into a format more understandable to the switches 132A, 132B. One example of a more understandable format is the "E911 telephone number" format mentioned above. The E911 telephone number accompanies the emergency call as it is routed by the gateway 118A to the appropriate one of the switches 132A, 132B.

In an analogous fashion, gateway 118B maintains a connection map 134B and also may convert received routing keys into E911 telephone numbers. Further detail regarding E911 telephone numbers and the operation of the gateways 118A, 118B will be given later on in this description.

Switches 132A, 132B, 152A and 152B currently operate entirely within the circuit-switched domain. However, this does not rule out the possibility of the switches 132A, 132B, 152A and 152B being retrofitted with the functionality of an IP gateway that would allow an IP connection from the network element 114 directly to the switches 132A, 132B, 152A and 152B via dedicated virtual trunk groups, thus bypassing the need for gateways 118A and 118B in this intermediate position. This possibility is envisaged in FIG. 1C. It is noted that a set of gateways 198A, 198B is still used to connect the network element 114 to the legacy switches 128A, 128B, 148A, 148B leading to the PSTN 116.

Returning to FIG. 1A, the PSAPs 138A to 138H are connected to an ALI database 140. The ALI database 140 is a known database that stores street addresses and associated telephone numbers, thus enabling a PSAP operator to obtain the street address corresponding to a given directory number from which an emergency call has originated. The ALI database 140 is connected to a 9-1-1 database management system (9-1-1 DBMS) 150, which maintains a mapping of street addresses to "emergency zones", such as a municipality, county or district, for example. The 9-1-1 DBMS 150 is accessible to the registration entity 190, either by a direct link or via the packet-switched network 100.

The architecture in FIG. 1A also comprises a street address guide (SAG) 160, which is accessed by the registration entity 190, either by a direct link or via the packet-switched network 100. The street address guide 160 provides validation of a street address in order to determine whether a particular entry corresponds to a realistic address.

In accordance with an embodiment of the present invention, certain steps are performed for each VoIP customer during a provisioning phase, which occurs before the placement of an emergency call by that VoIP customer, and is now described with reference to the signal flow diagrams in FIGS. 2A through 2H, which correspond to steps 2-A through 2-H. In fact, it may be advantageous to perform the following steps during the same general time frame as when the VoIP customer obtains his or her directory number N.

At step 2-A, the VoIP customer provides a service address to the registration entity 190. The service address, which may differ from the billing address, is typically the geographic location of the VoIP customer, which may be the civic (street) address where the VoIP customer is located, although it is envisaged that in some embodiments it may be the latitude/longitude of the VoIP customer or some other form of localization data. The manner in which the VoIP customer provides the service address to the registration entity 190 is not material to the present invention and may include the usage of the web, email, snail mail, etc. It is noted that step 2-A may be performed at the same time as when the VoIP customer is first assigned a directory number N and in fact it is envisaged that the execution of step 2-A may even be made a condition for the delivery of VoIP services.

At step 2-B, the registration entity 190 validates the service address supplied by the user. This can be achieved by running the service address through a street address guide (SAG) 160 that is available to the VoIP service provider. Validation provides an assurance that the service address given by the user is a valid address, i.e., really exists, and therefore will be capable of being meaningfully associated with an emergency zone and its designated PSAP. If validation at step 2-B is unsuccessful, then the VoIP customer may be asked to re-enter the service address with a greater degree of precision or may be prompted to resolve an ambiguity by choosing the service address from a list of two or more address choices. Step 2-B may also be performed interactively with the VoIP customer and may involve the intervention of a customer service representative.

Provided validation at step 2-B is successful, the registration entity 190 proceeds to step 2-C, which consists of supplying the validated street address to the 9-1-1 DBMS 150. The 9-1-1 DBMS 150 has the functionality of identifying an emergency zone associated with the service address. In one embodiment, the 9-1-1 DBMS 150 maintains a mapping that associates postal codes (zip codes) to emergency zones. Thus, a given service address having a given postal code will map to a corresponding emergency zone.

At step 2-D, the 9-1-1 DBMS 150 returns a file processing confirmation 209 to the registration entity 190. The file processing confirmation 209 may identify the emergency zone (hereinafter denoted 210) associated with the service address in question.

At step 2-E, which may actually be executed before step 2-D, the 9-1-1 DBMS 150 provides the directory number N and the validated street address to the ALI database 140 for storage therein.

At step 2-F, the 9-1-1 DBMS 150 updates the forwarding tables at the switches 132A, 132B, 152A, 152B, with routing information 202 for the purposes of eventual call transfer to dispatch agencies (police, fire, ambulance) as per established routines. In an example, the individual emergency telephone numbers corresponding to police, fire and ambulance agencies which are associated with emergency zone 210 are entered into the forwarding table in association with directory number N.

At step 2-G, which may actually be executed before step 2-F, the registration entity 190 consults a call routing list (CRL) 188, which associates emergency zones 210 to individual "routing keys" 214. The result of step 2-G is the obtaining of a routing key 214 that corresponds to the emergency zone 210. By virtue of the association between each directory number N and its emergency zone 210, and by virtue of the association between each emergency zone 210 and its routing key 214, it will be apparent that each directory number N will be associated with a routing key 214. Also, since more than one emergency zone may be serviced by the same PSAP, a plurality of directory numbers N will share the same routing key 214.

At step 2-H, the registration entity 190 provides the directory number N and the associated routing key 214 (obtained at step 2-G) to the network entity 114. The network entity 114 enters this information into a table 178 local to the network entity 114. The table 178 may be stored in the network entity 114 or otherwise directly accessible thereto.

FIG. 3A shows a specific, non-limiting example of the table 178 that is local to the network entity 114. Basically, the table 178 comprises a plurality of records 204, each containing a directory number N and a related routing key 214. A particular routing key 214 comprises information that defines a route to be taken by an emergency call in order to reach a particular PSAP. In one embodiment, not to be considered as limiting, the routing key 214 comprises a gateway identifier 214A and a routing code 214B. Further detail regarding the purpose and effect of fields 214A, 214B will be given later on in this specification.

In an alternative embodiment of steps 2-G and 2-H, shown in FIGS. 2-I and 2-J, the registration entity 190 provides the directory number N and the associated emergency zone 210 to the network entity 114, and it is the network entity 114 that consults a call routing list (CRL) 188 in order to obtain the appropriate routing key 214 for the emergency zone 210 in question. In this case, and with reference to FIG. 3B, the table 178' local to the network element 114 would comprise a plurality of records, each containing a directory number N, a related emergency zone 210 and a related routing key 214.

With additional reference now to the diagrams of FIGS. 4-A to 4-F, placement of an emergency call and operation of the various elements in the architecture of FIG. 1 in a "call handling" phase is now described.

At step 4-A, the network element 114 detects an emergency call 400 received from a VoIP customer associated with a particular directory number N.

At step 4-B, the network element 114 consults the table 178 (or 178') which is local to the network element 114 and retrieves the routing key 214 for the directory number N.

As previously mentioned, the routing key 214 contains a gateway identifier 214A, which identifies the destination gateway towards which the emergency call 400 should be routed. Let this destination gateway be gateway 118A. In addition, the routing key 214 contains a routing code 214B which, when interpreted by gateway 118A, will identify (i) a destination switch towards which gateway 118A should route the emergency call 400 and (ii) the destination PSAP for the emergency call 400. For the purposes of this example, let the destination switch be switch 132B and let the destination PSAP be PSAP 138C.

At step 4-C, the network element 114 routes the emergency call 400 onto the virtual trunk group assigned to the destination gateway, in this case gateway 118A. In addition, as part of step 4-C, the network element 114 forwards the routing code 213B along with the emergency call 400. In an alternative embodiment, the network element 114 forwards the routing key 214 in its entirety. The forwarded information accompanies the emergency call 400 as it is routed to gateway 118A.

At step 4-D, the gateway 118A receives the emergency call 400 from the network element 114. The emergency call 400 is accompanied by at least the routing code 214B. Gateway 118A reads the routing code 214B in order to learn (i) the identity of the destination switch (in this case switch 132B) towards which the emergency call 400 should be routed by gateway 118A and (ii) the identity of the destination PSAP (in this case PSAP 132C) towards which the emergency call 400 should be routed by the destination switch 132B. Additionally, gateway 118A obtains the E911 telephone number corresponding to the destination PSAP 138C, hereinafter denoted 250. The destination gateway 118A then proceeds to route the emergency call 400 to the destination switch 132B and forwards the E911 telephone number 250 along with the emergency call 400.

At step 4-E, the destination switch (in this case switch 132B) routes the received emergency call 400. Routing is performed on the basis of the E911 telephone number 250 received from gateway 118A, resulting in the emergency call 400 being transferred onto a dedicated line leading towards the destination PSAP (in this case PSAP 138C) over the E911 network 122.

At step 4-F, once the incoming emergency call 400 is received at the destination PSAP 138C, it is handled by a trained responder. With knowledge of the directory number N (which follows the emergency call 400 from its inception), the responder obtains the validated service address associated with the directory number N. In one embodiment, the responder queries the ALI database 140 upon receipt of the emergency call 400 in order to obtain the validated service address. In an alternative embodiment, the validated service address is pushed by the ALI database 140 during a previous step. Specifically, after step 4-E described above, receipt of the emergency call 400 by switch 132B could be followed by switch 132B supplying the directory number N to the ALI database 140, which then pushes the validated service address to the destination PSAP 138C. In either case, the responder learns the exact geographic location of the caller and can dispatch emergency personnel if necessary.

In an example scenario, the responder may determine that a particular type of emergency agency (police, ambulance, fire) needs to be dispatched. A forwarding code can be dialed back to switch 132B from which the emergency call 400 originated. The forwarding code triggers switch 132B to use its internal forwarding table in order to forward the emergency call 400 to a particular emergency telephone number where the appropriate agency can be reached. Since the updating of the forwarding table was done in the provisioning phase at step 2-F (as described earlier), the emergency call 400 will be automatically forwarded to the agency of the appropriate type that is geographically in the best position to handle the emergency call 400.

Figure 1B:
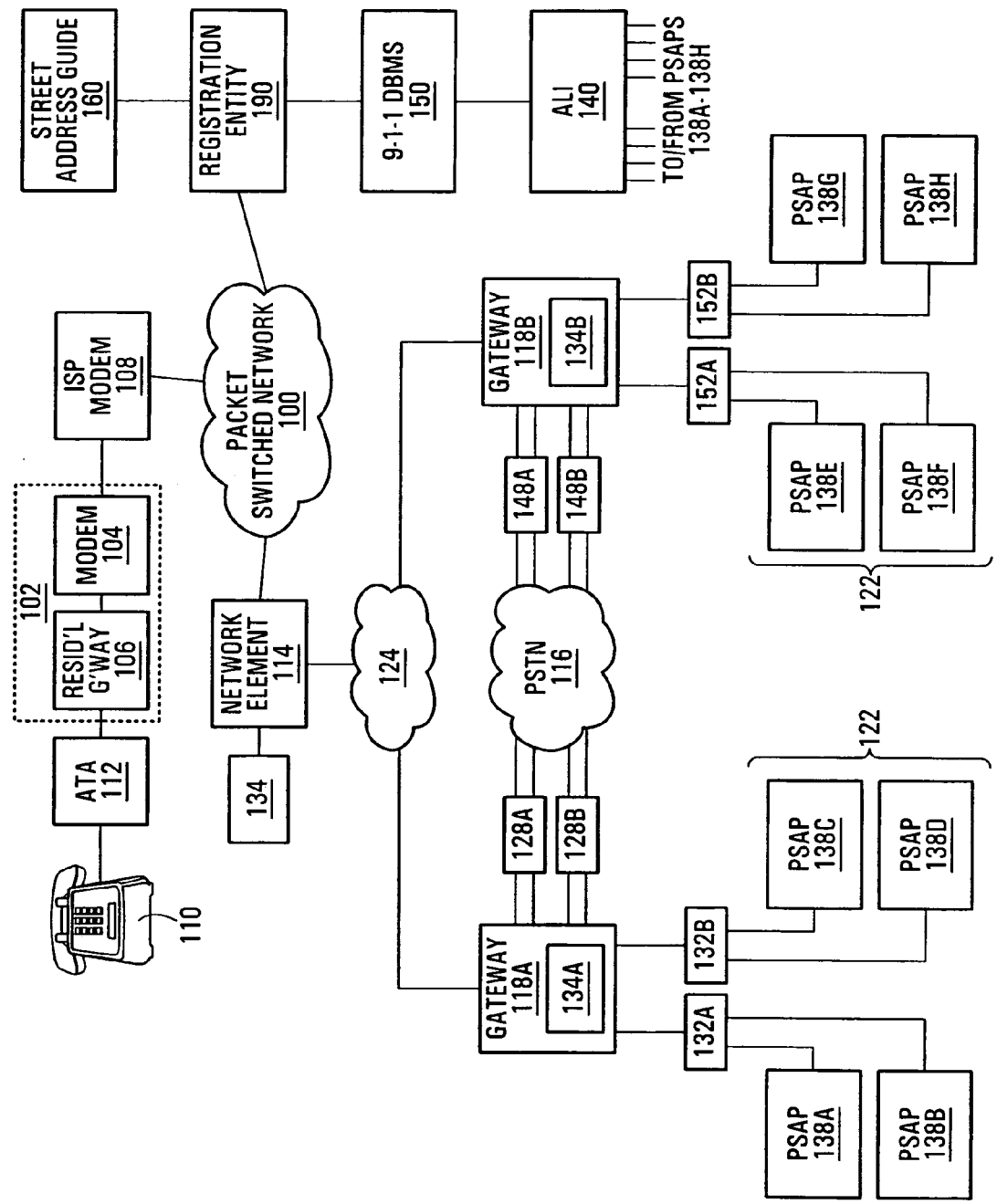
Figure 1C:
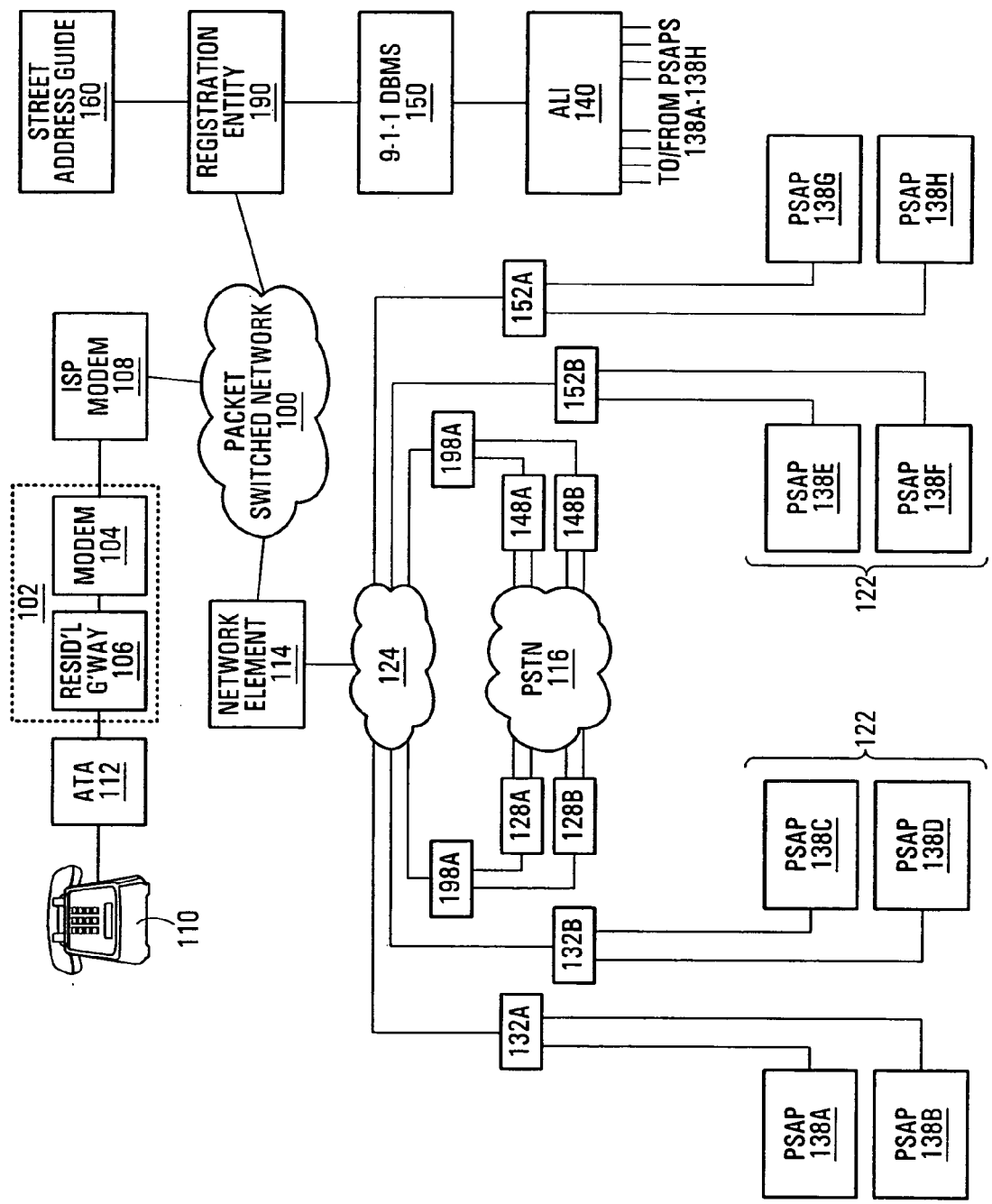
Figure 2A:
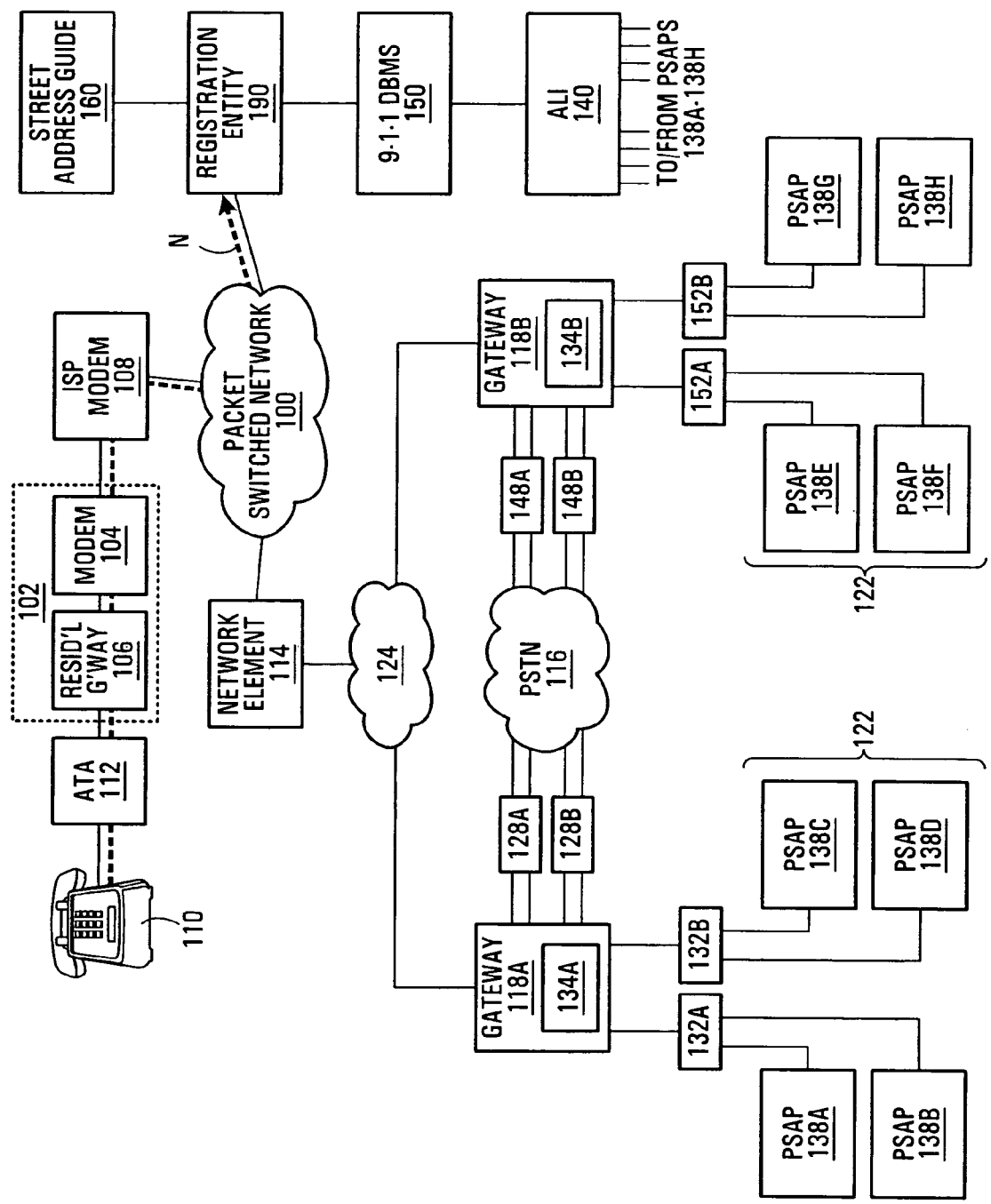
FIGS. 2A to 2J show interaction of the various network elements in the architecture of FIG. 1A during a provisioning phase.
Figure 2B:
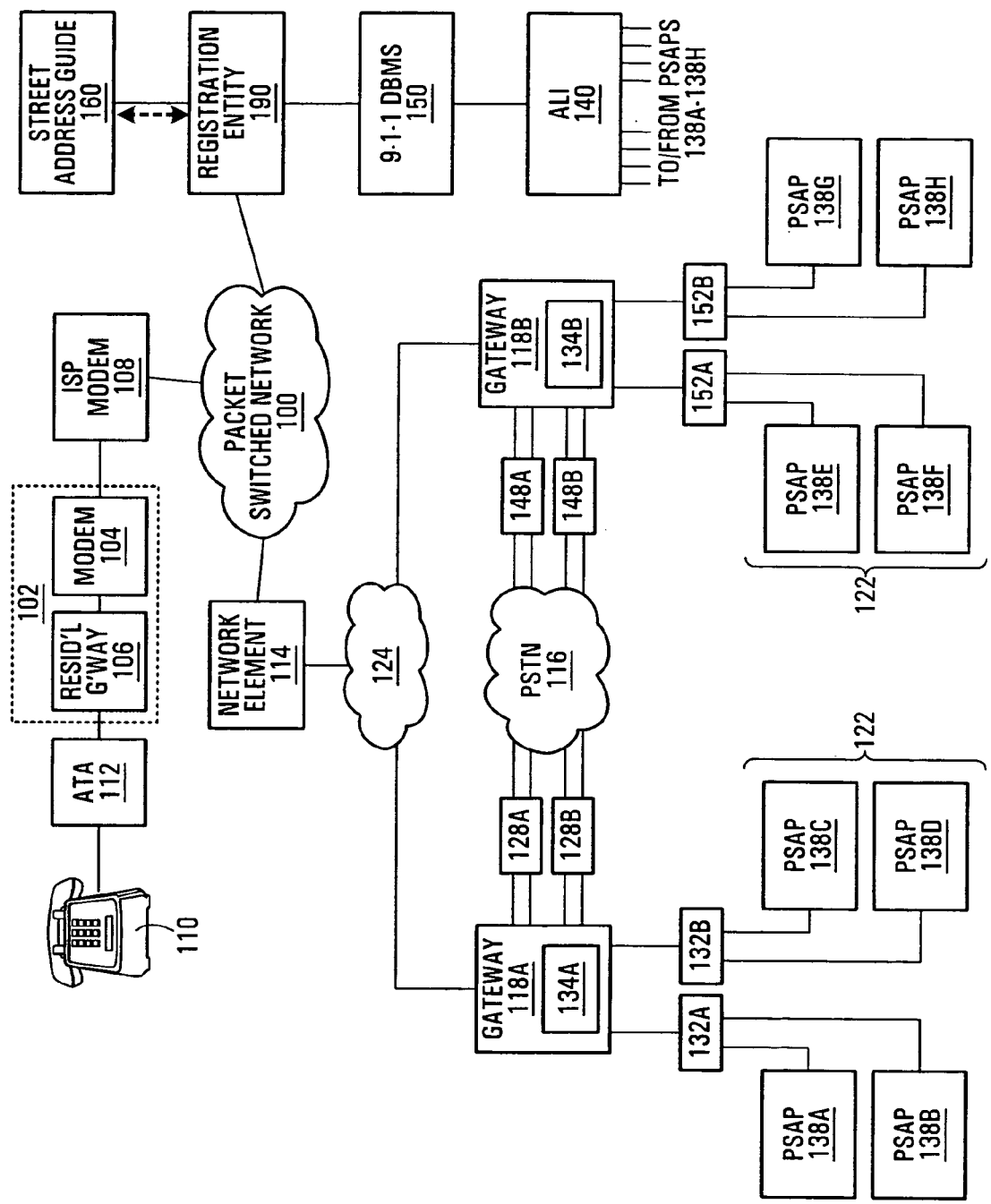
Figure 2C:
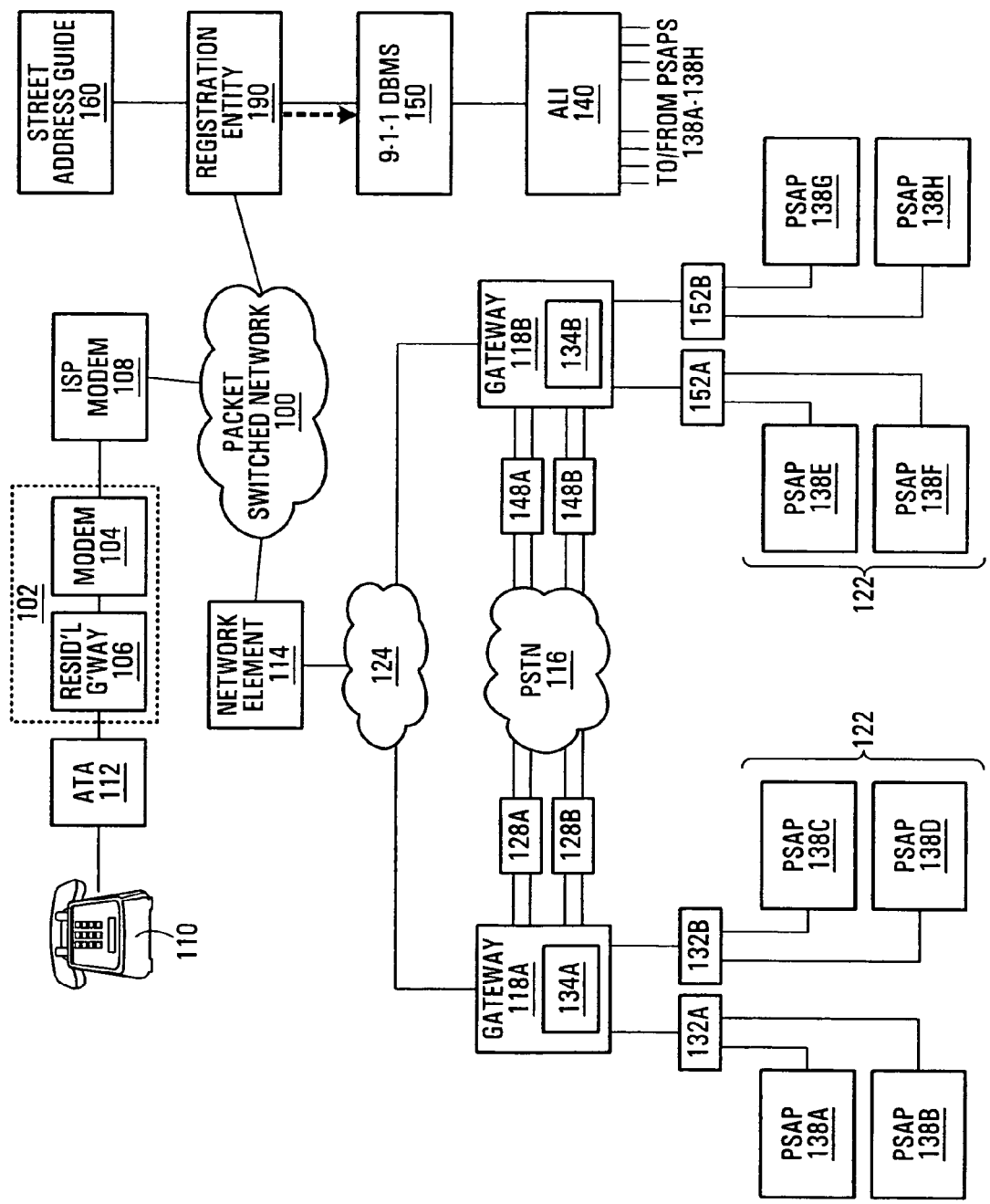
Figure 2D:
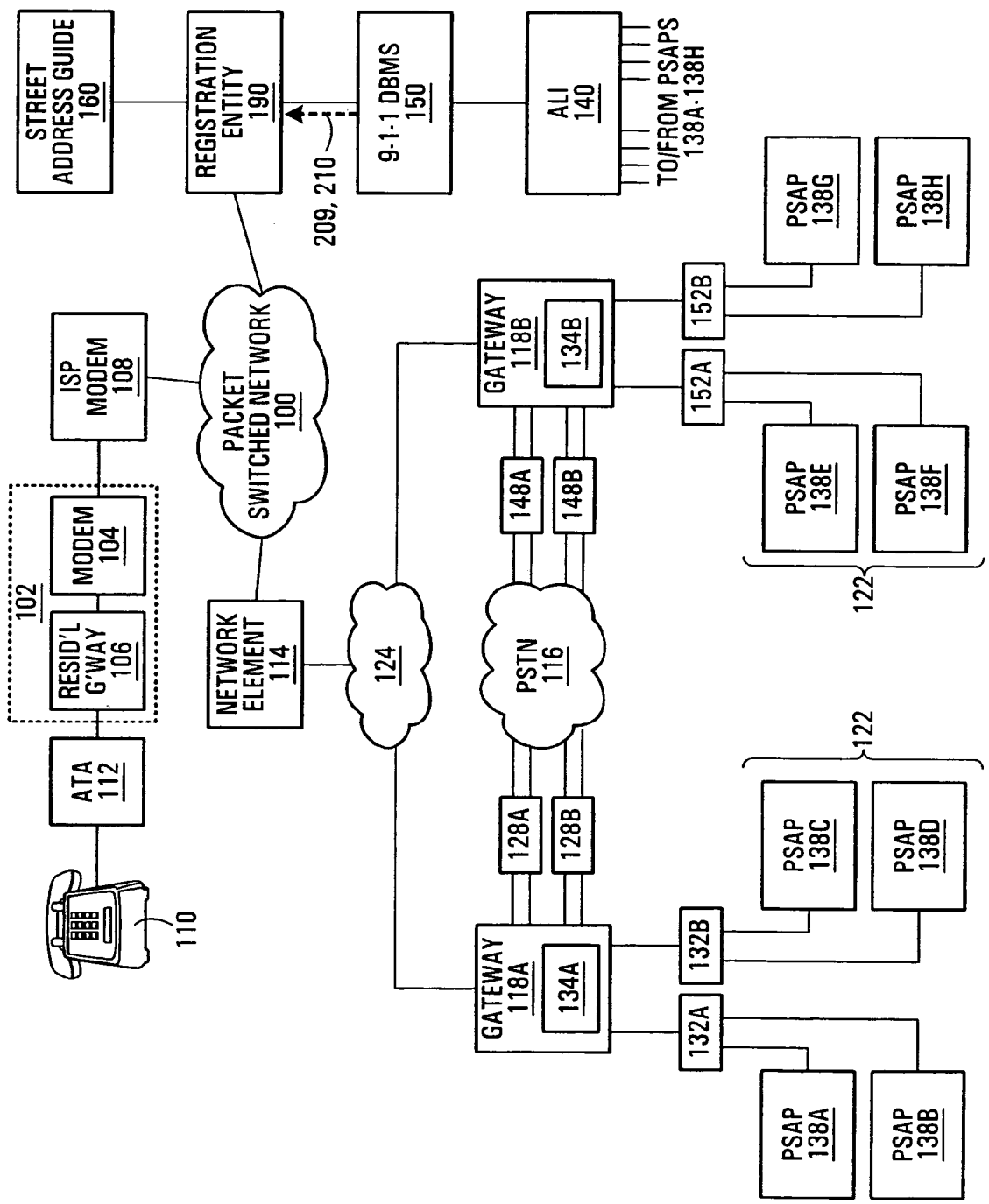
Figure 2E:
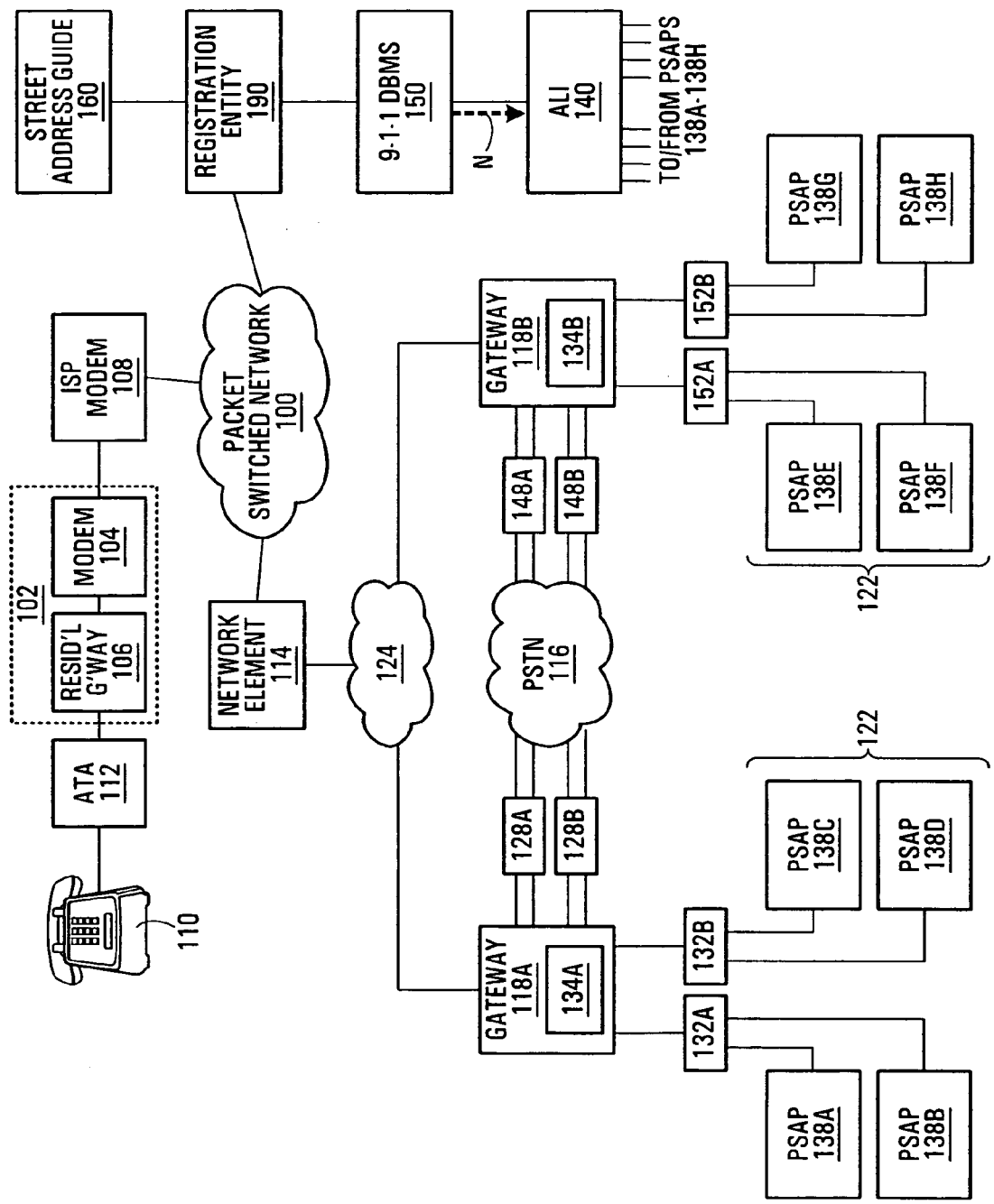
Figure 2F:
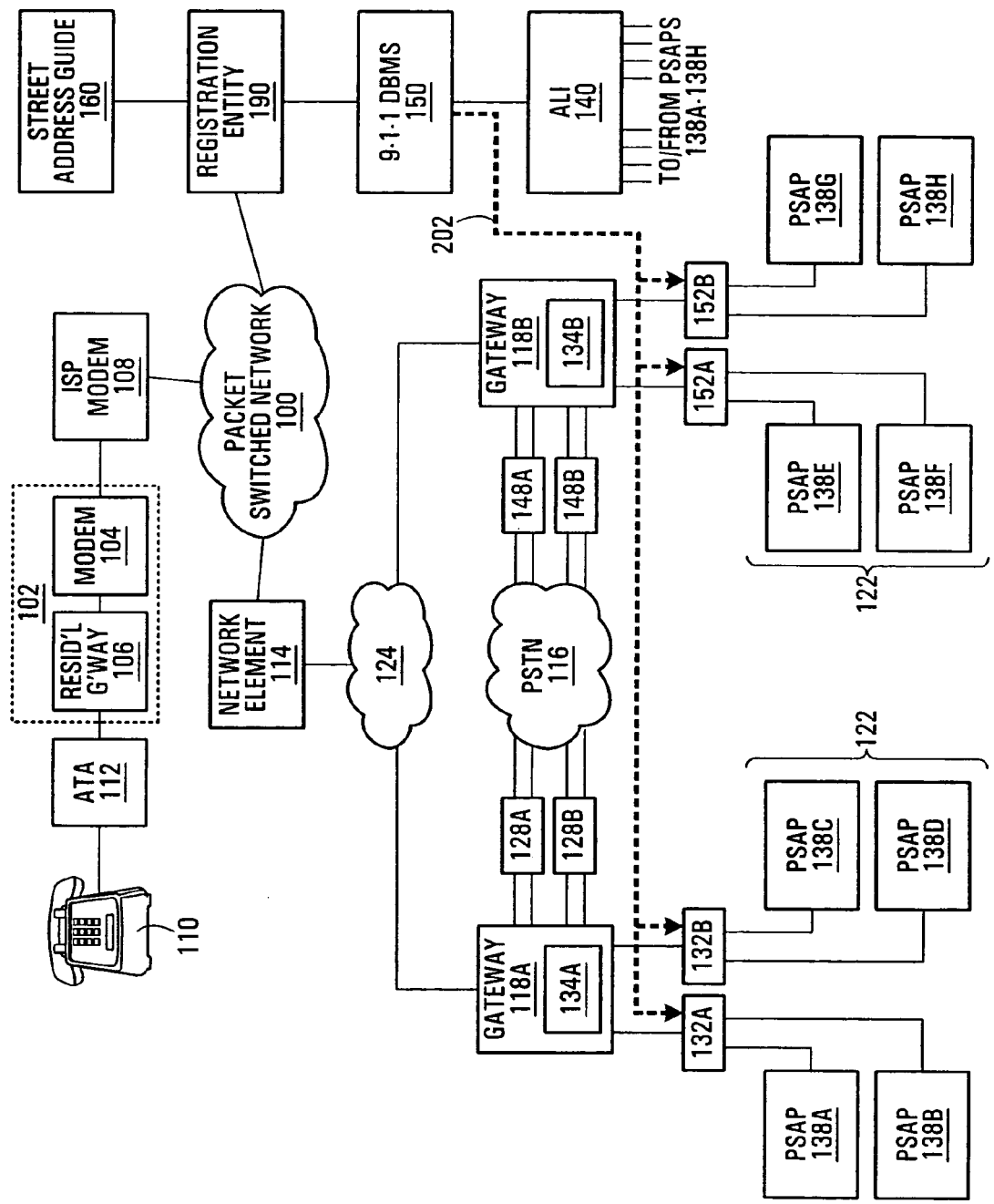
Figure 2G:
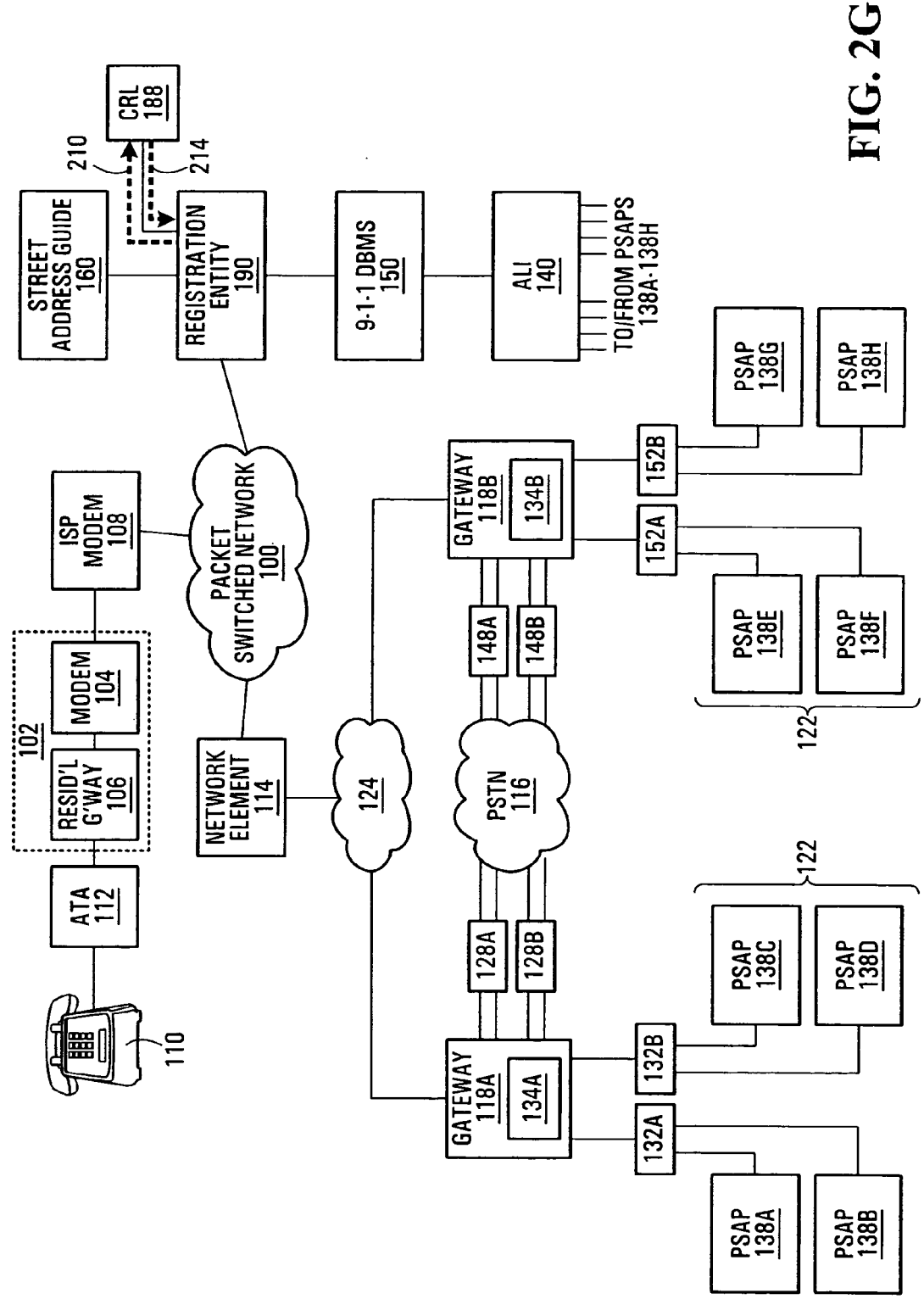
Figure 2H:
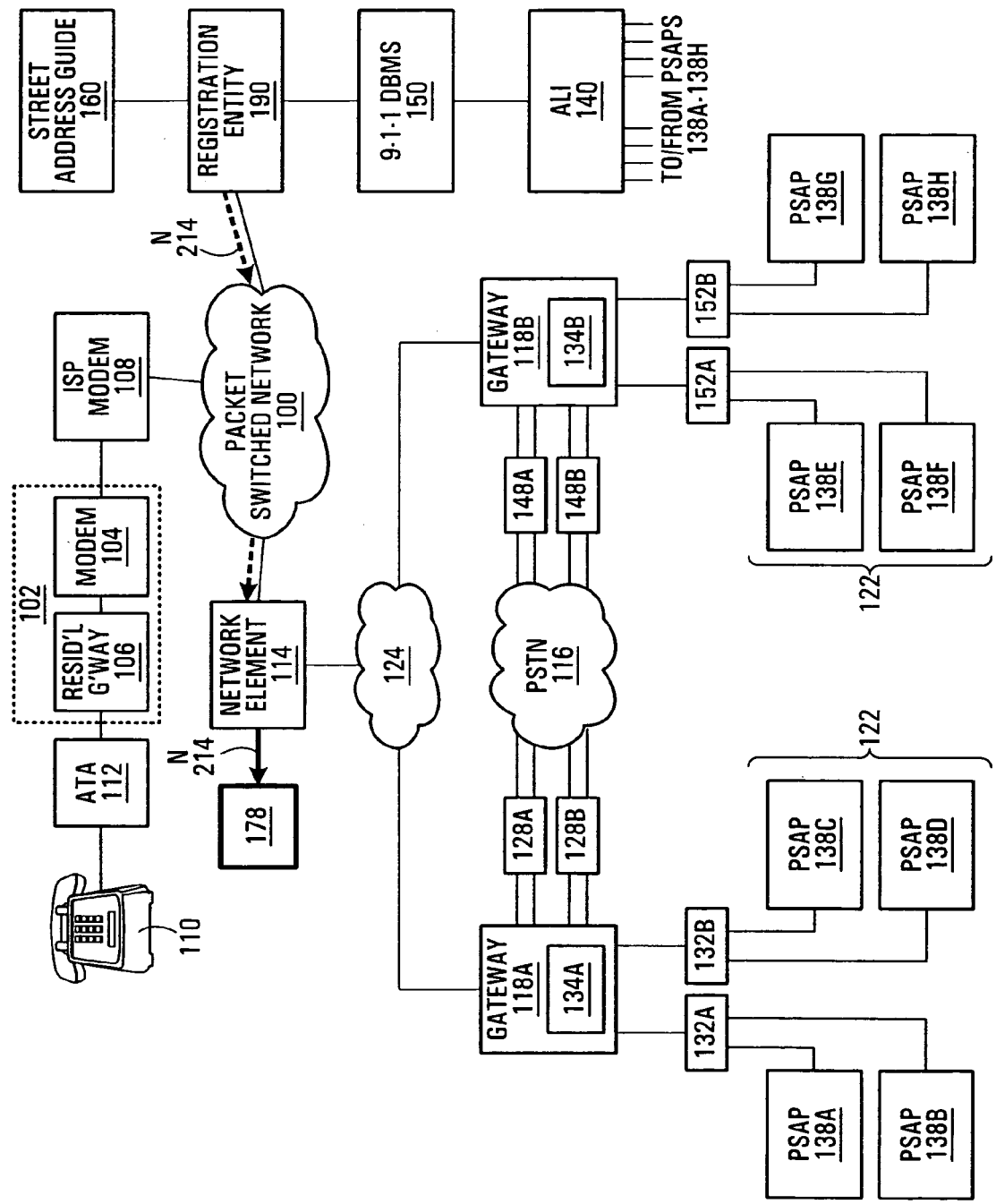
Figure 2I:
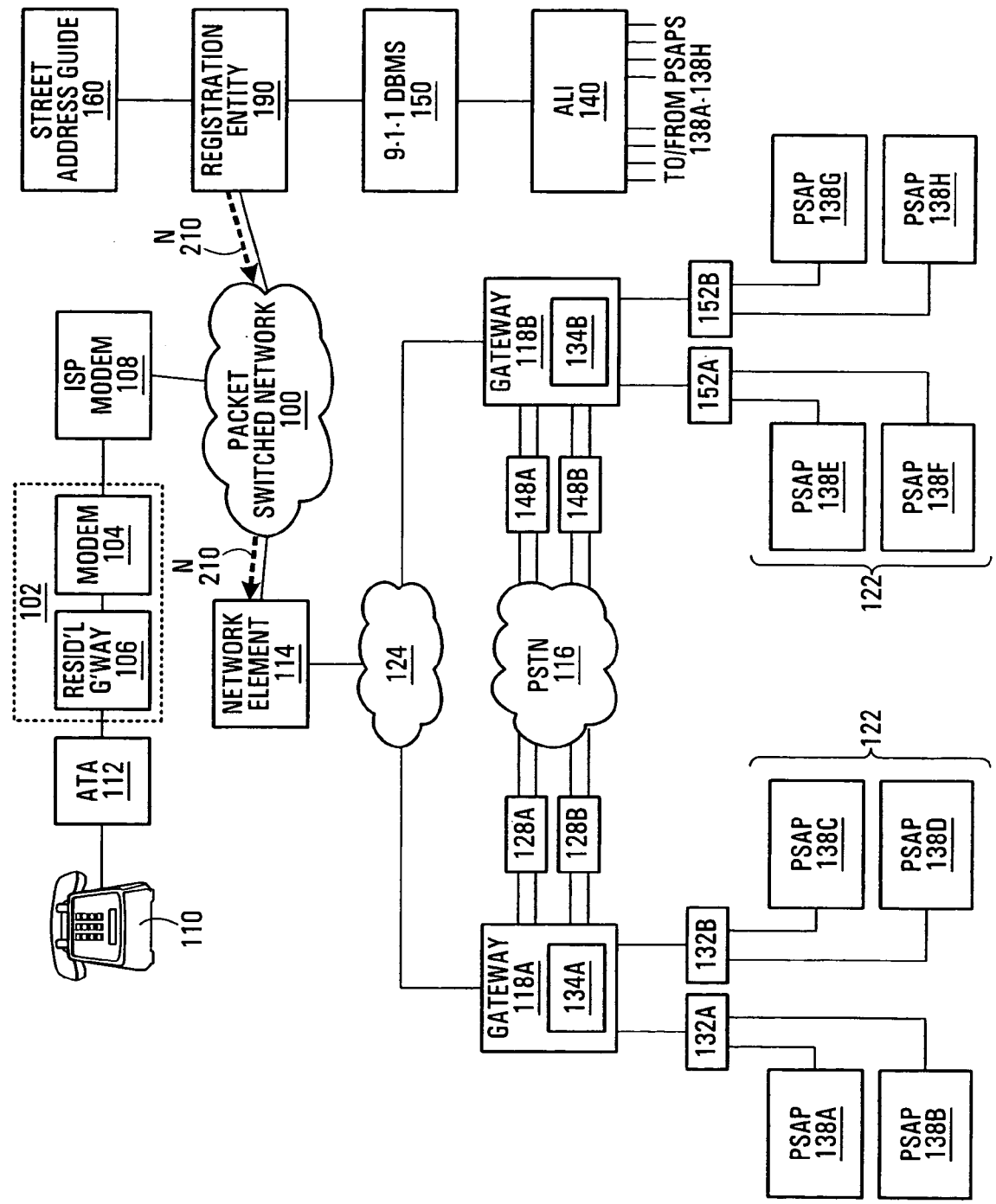
Figure 2J:
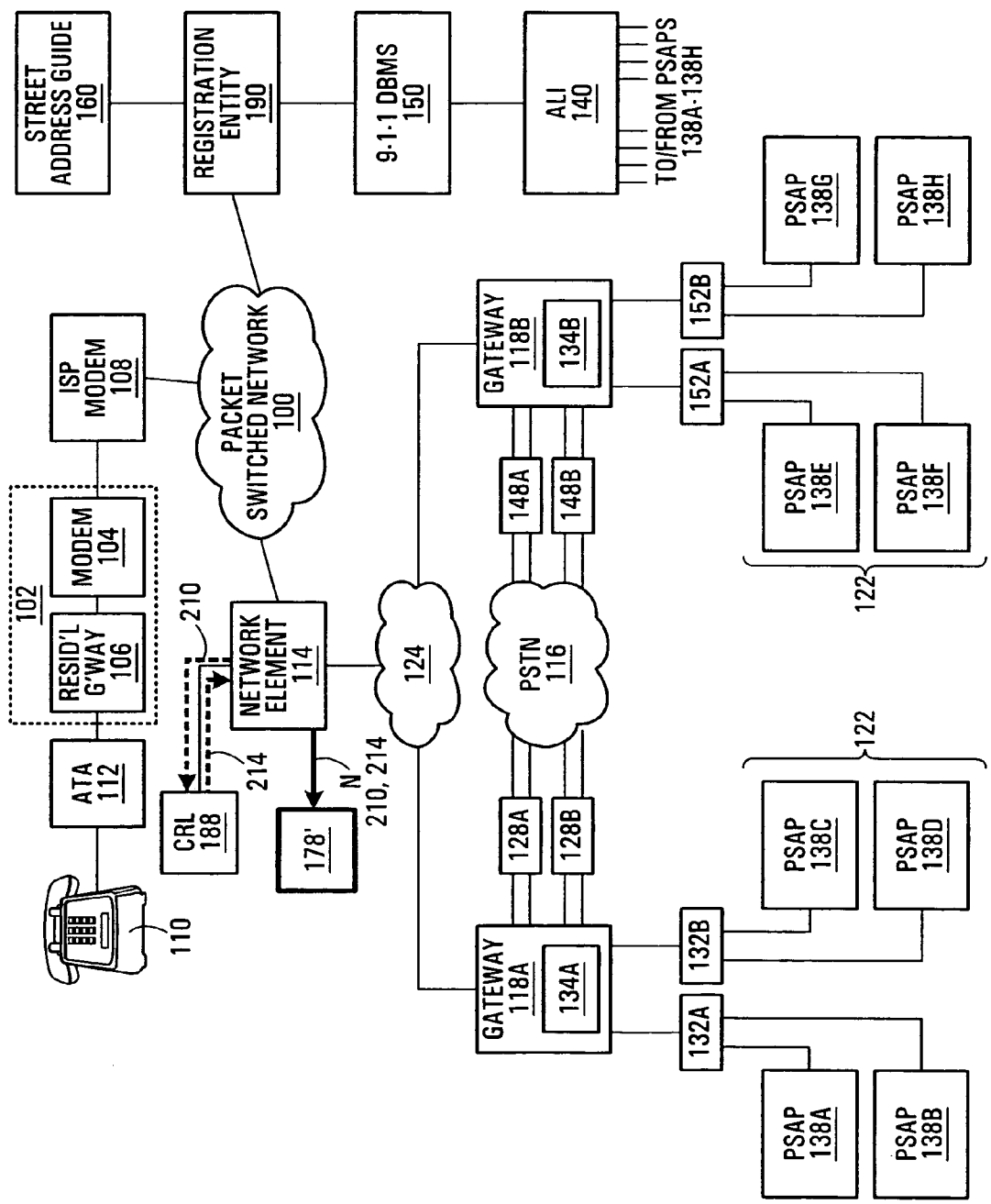
Figure 4A:
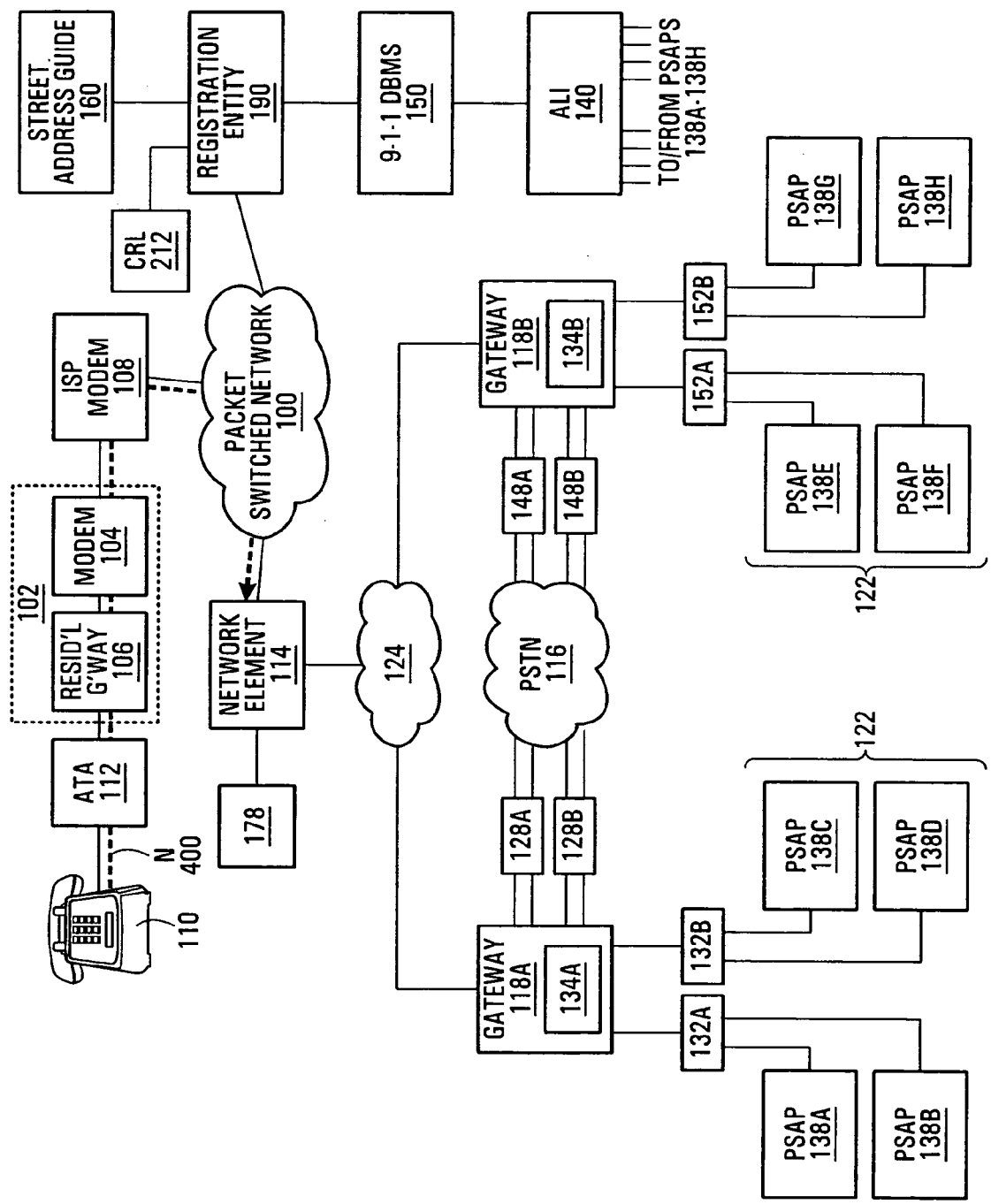
FIGS. 4A to 4F show interaction of the various network elements in the architecture of FIG. 1A during a call handling phase.
Figure 4B:
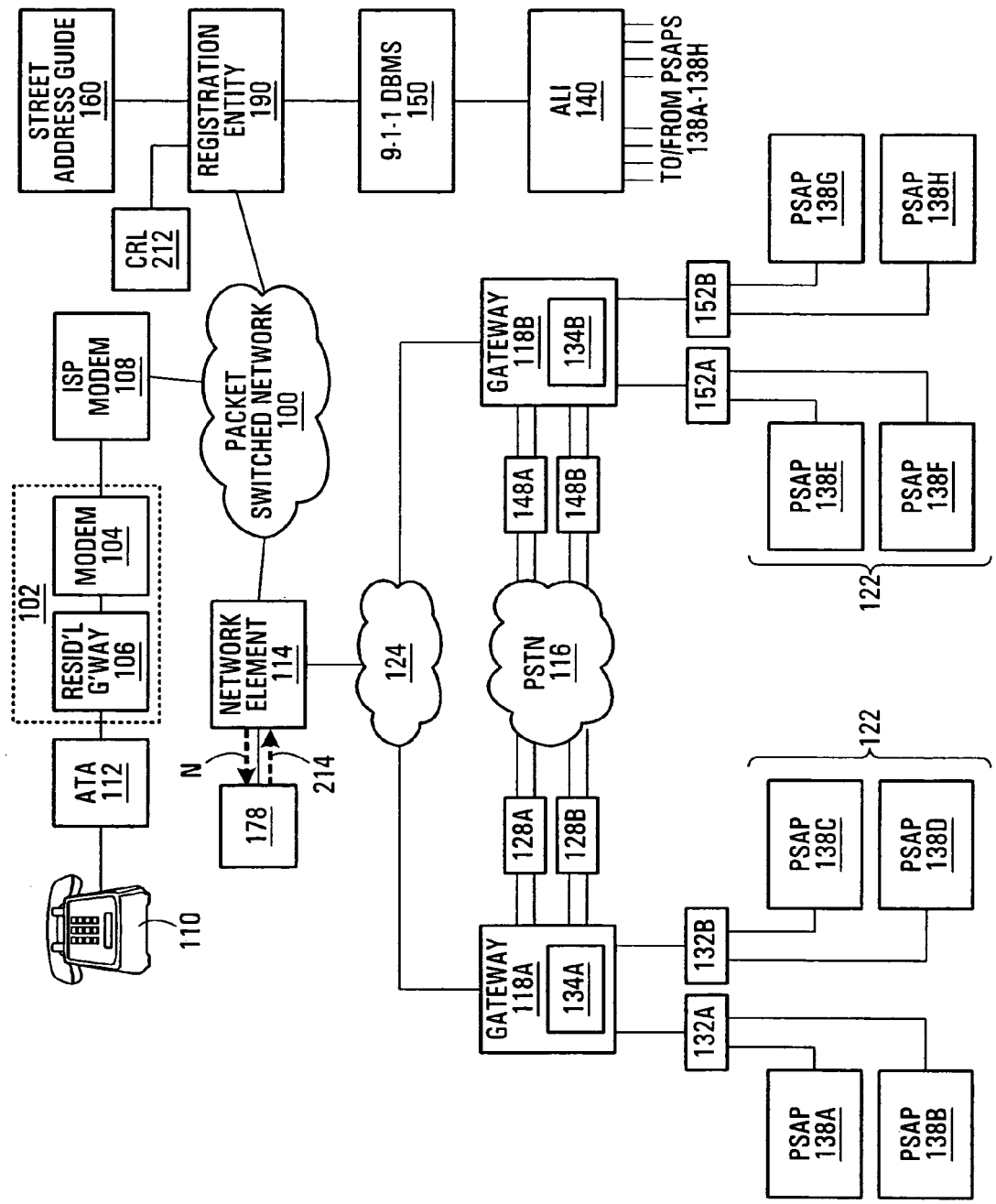
Figure 4C:
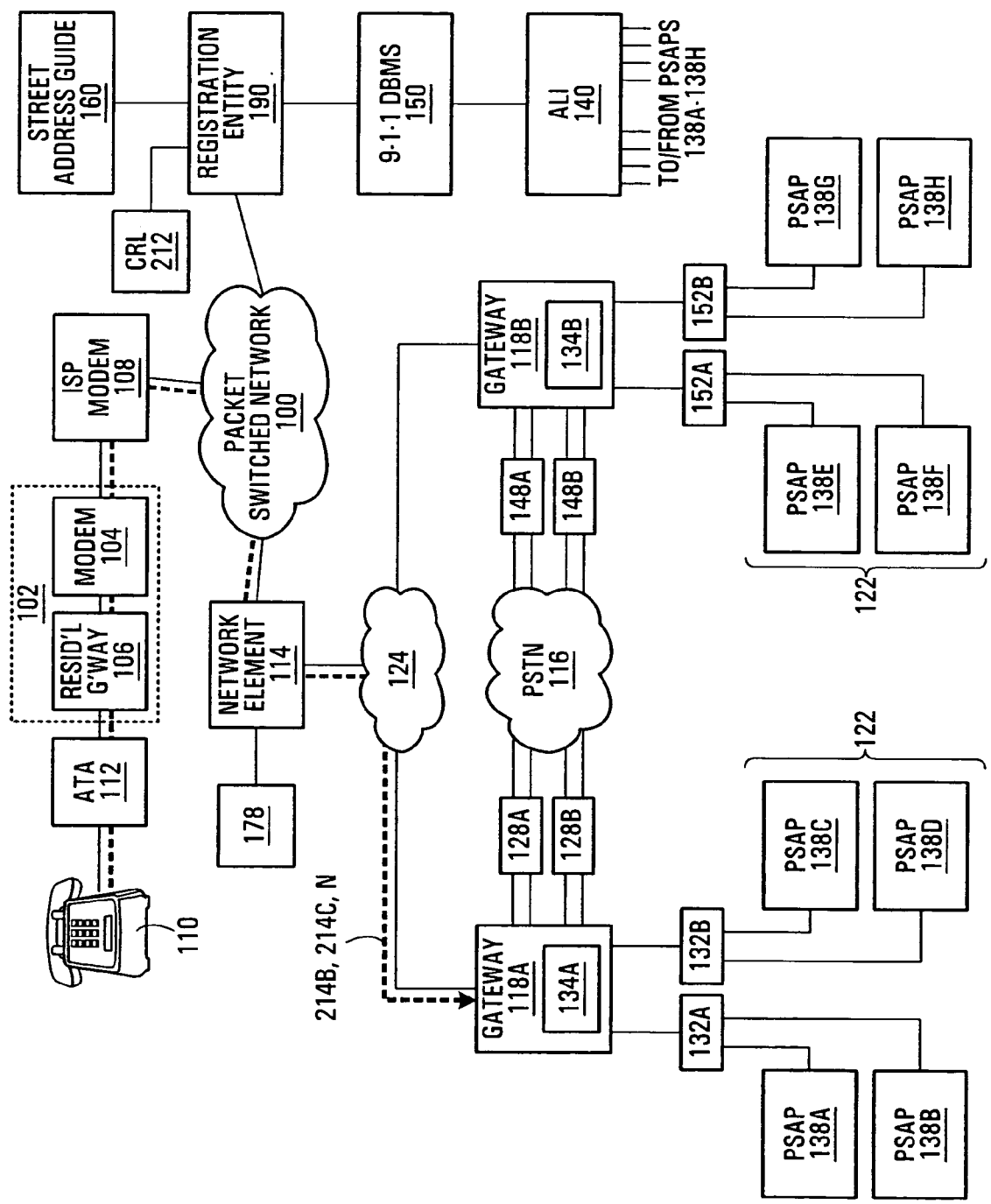
Figure 4D:
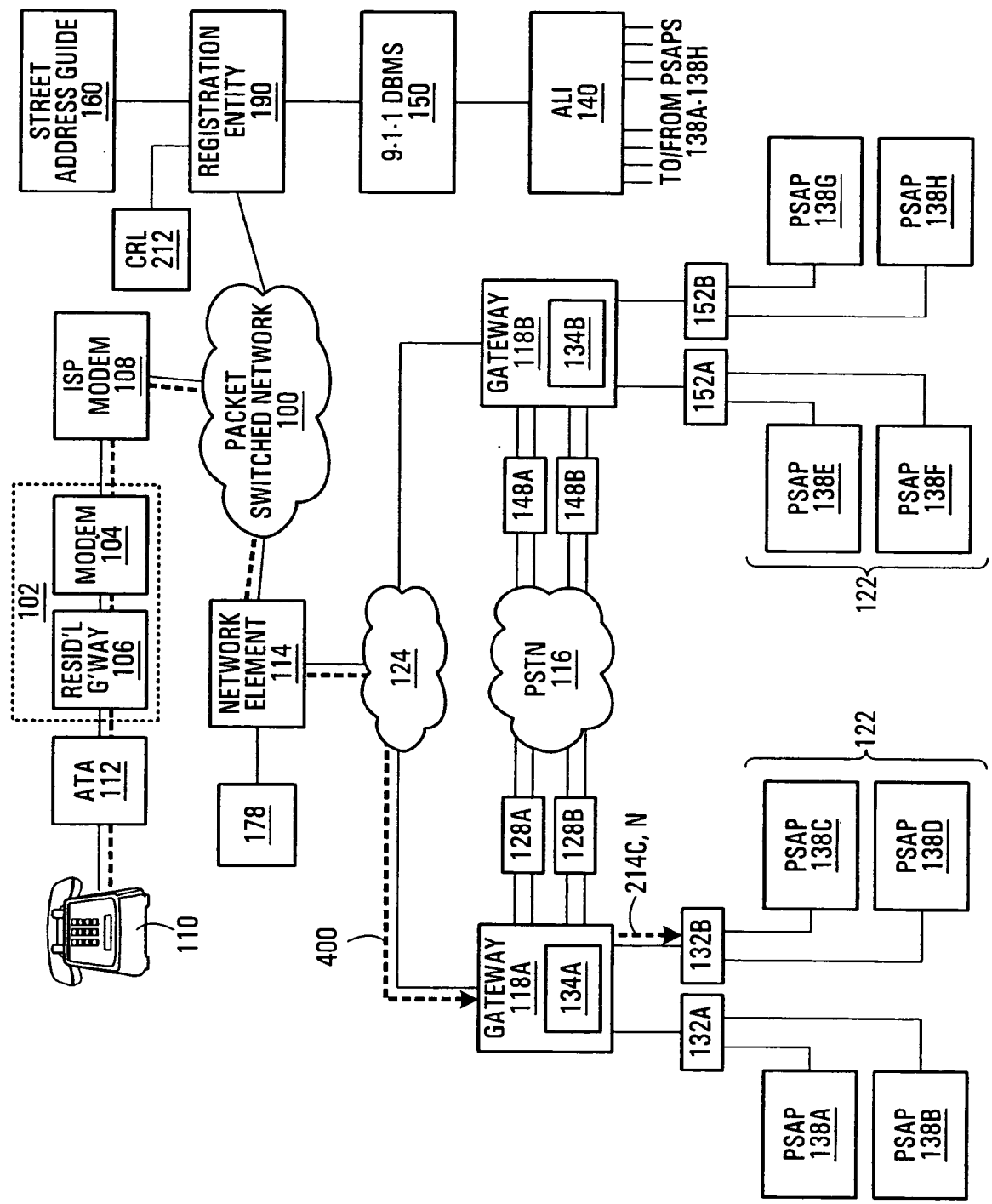
Figure 4E:
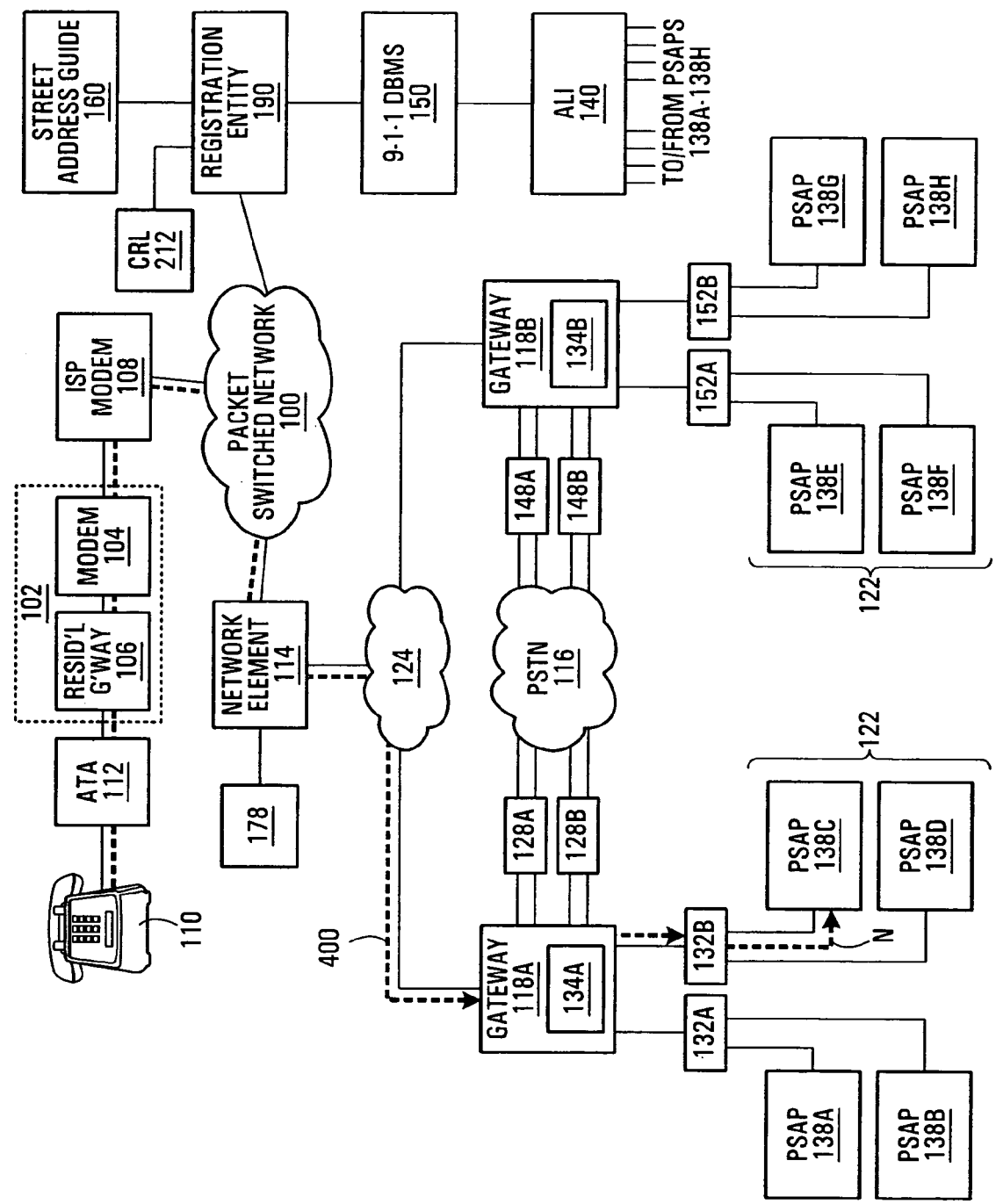
Figure 4F:
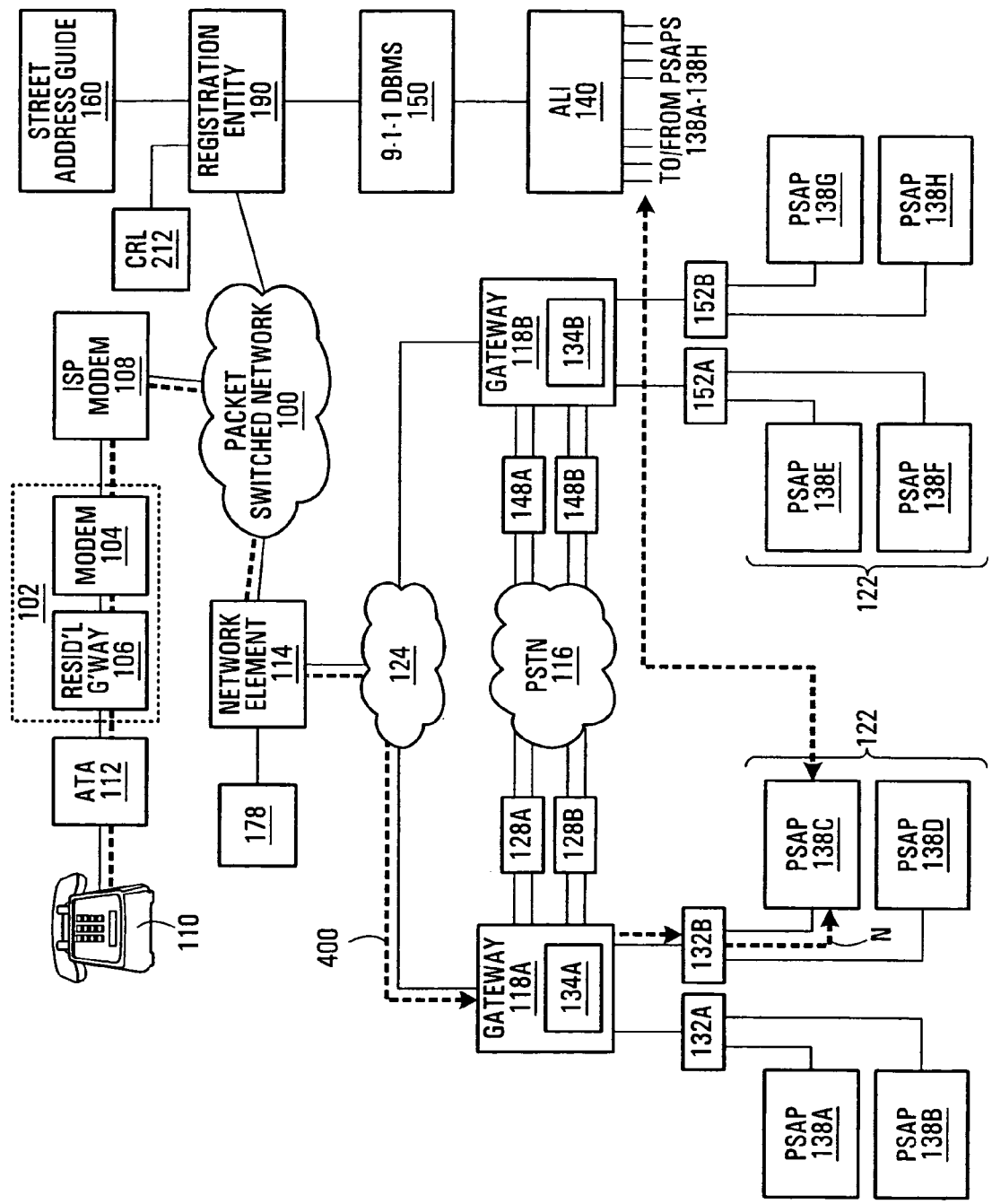

Of course other embodiments of explicit routing using a routing key 214 are within the scope of the present invention. For instance, it is envisaged that the routing code 214B mentioned above may comprise only the E911 telephone number 250 corresponding to the destination PSAP. In such a scenario, a gateway that receives the emergency call and the associated E911 telephone number 250 would access a local table to obtain the identity of the switch that is connected to the destination PSAP. In fact, the functionality of consulting a local table could be relegated to network element 114, such that it is the network element 114 that determines the ports that need to be used by the gateway when routing the emergency call in question, in order that the call reach the destination PSAP. FIG. 1B shows such an embodiment, where the connection maps (134A, 134B in FIG. 1A, formerly executed by the gateways 118A, 118B, respectively) have been consolidated into a single connection map executed at the network element 114.

From the above description, it will be noted that the assignment of a routing key 214 to each directory number N permits independence of the directory number N and the destination PSAP. In other words, there need not be any relationship between the "area code" or "local exchange" of the directory number N and the destination PSAP, which is unlike the case with the traditional telephony infrastructure. As a result, VoIP service providers can assign arbitrary directory numbers to their customers, while ensuring that emergency services will be dispatched effectively by the appropriate PSAP for each customer. Moreover, as has been shown using the example of FIGS. 4-A to 4-F, emergency calls 400 can be directed to the appropriate PSAP over a dedicated emergency circuit in the E911 network 122, rather than over an administrative line, thereby maximally assuring a prompt response by trained personnel.

Those skilled in the art will appreciate that in some embodiments, the functionality of parts of the network element 114 and/or the registration entity 190 may be implemented as pre-programmed hardware or firmware elements (e.g., application specific integrated circuits (ASICs), electrically erasable programmable read-only memories (EEPROMs), etc.), or other related components. In other embodiments, parts of the network element 114 and/or the registration entity 190 may be implemented as an arithmetic and logic unit (ALU) having access to a code memory (not shown) which stores program instructions for the operation of the ALU. The program instructions could be stored on a medium which is fixed, tangible and readable directly by the network element 114 and/or the registration entity 190, (e.g., removable diskette, CD-ROM, ROM, or fixed disk), or the program instructions could be stored remotely but transmittable to the network element 114 and/or the registration entity 190 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method of routing an emergency call received at a network element, comprising:
   determining a directory number associated with a communication device having originated the emergency call;
   consulting a local database to obtain routing information associated with the directory number; and
   directing the call and the routing information over a path dedicated to emergency calls.

2. The method defined in claim 1, wherein the path dedicated to emergency calls includes a virtual trunk group.

3. The method defined in claim 2, wherein the path dedicated to emergency calls further comprises dedicated circuit-switched lines.

4. The method defined in claim 1, wherein the path dedicated to emergency calls comprises dedicated circuit-switched lines.

5. A network element for use in a network that provides voice-over-packet services to a plurality of communication devices, each of the communication devices being associated with a respective directory number, the network element comprising:
   a database that relates routing keys to respective directory numbers;
   a control entity operative for:
      receiving an incoming call originated by one of the communication devices;
      determining the directory number associated with the communication device having originated the call;
      determining whether the call is an emergency call;
      responsive to the call being an emergency call:
         (i) accessing the database to obtain the routing key related to the directory number; and
         (ii) directing the call and the routing key obtained at (i) towards a gateway over a trunk group dedicated to emergency calls, the gateway connecting the network element to a dedicated emergency network.

6. The network element defined in claim 5, wherein the trunk group dedicated to emergency calls is a virtual trunk group.

7. The network element defined in claim 5, wherein the control entity being operative to determine whether the call is an emergency call comprises the control entity being operative to determine whether a set of leading digits have been dialed.

8. The network element defined in claim 5, wherein the control entity being operative to determine whether the call is an emergency call comprises the control entity being operative to determine whether the set of leading digits is selected from the group consisting of "9-1-1", "1-1-2" and "9-9-9".

9. The network element of claim 5 being a packet switch.

10. The network element of claim 5 being a softswitch.

11. The network element of claim 5 being a multimedia communication server (MCS).

12. The network element defined in claim 5, wherein the dedicated emergency network connects the gateway to a plurality of public safety answering points (PSAPs), wherein the routing key related to a particular directory number associated with a particular communication device defines a route to a particular one of the PSAPs.

13. A network architecture for providing voice-over-packet services to a plurality of communication devices, each of the communication devices being associated with a respective directory number, the network architecture comprising:
   (a) a packet switch;
   (b) a gateway connected to the packet switch and connectable to a circuit-switched emergency network;
   (c) a database that relates individual directory numbers to respective routing keys;
   (d) wherein the packet switch is operative for:
      receiving an incoming emergency call from one of the communication devices;
      determining the directory number associated with the communication device having placed the emergency call;
      accessing the database to obtain the routing key related to the directory number determined in the previous step;
      directing the emergency call, the associated directory number and the associated routing key towards the gateway.

14. The network architecture defined in claim 13, wherein directing the emergency call towards the gateway is performed over a trunk group dedicated to emergency calls.

15. The network architecture defined in claim 14, wherein the trunk group dedicated to emergency calls is a virtual trunk group.

16. The network architecture defined in claim 15, the gateway being operative for:
   receiving the incoming emergency call, the associated directory number and the associated routing key from the packet switch;
   determining an emergency telephone number in the circuit-switched emergency network on the basis of the received routing key;
   directing the emergency call and the associated directory number towards the emergency telephone number determined in the previous step.

17. A network architecture for providing voice-over-packet services to a plurality of communication devices, each of the communication devices being associated with a respective directory number, the network architecture comprising:
   (a) a packet switch;
   (b) a gateway connected to the packet switch and connectable to a circuit-switched emergency network;
   (c) a database that relates individual directory numbers to respective routing keys;
   (d) wherein the packet switch is operative for:
      receiving an incoming call originated by one of the communication devices;
      determining the directory number associated with the communication device having originated the call;
      determining whether the call is an emergency call;
      responsive to the call being an emergency call:
         (i) accessing the database to obtain the routing key related to the directory number; and
         (ii) directing the call, the associated directory number and the routing key obtained at (i) towards the gateway.

18. The network architecture defined in claim 17, wherein directing the emergency call towards the gateway is performed over a trunk group dedicated to emergency calls.

19. The network architecture defined in claim 18, wherein the trunk group dedicated to emergency calls is a virtual trunk group.

20. The network architecture defined in claim 19, the gateway being operative for:
- receiving the incoming emergency call, the associated directory number and the associated routing key from the packet switch;
- determining an emergency telephone number in the circuit-switched emergency network on the basis of the received routing key;
- directing the emergency call and the associated directory number towards the emergency telephone number determined in the previous step.

21. The network architecture defined in claim 20, wherein the packet switch being operative to determine whether the call is an emergency call comprises the packet switch being operative to determine whether a set of leading digits have been dialed.

22. The network architecture defined in claim 20, wherein the packet switch being operative to determine whether the call is an emergency call comprises the packet switch being operative to determine whether the set of leading digits is selected from the group consisting of "9-1-1", "1-1-2" and "9-9-9".

23. The network element defined in claim 20, wherein the routing key related to a particular directory number associated with a particular communication device defines a route to a particular one of the PSAPs.

24. A computer-readable storage medium comprising instructions for execution by a computer to implement a method of routing an emergency call received at a network element, the method comprising:
- determining a directory number associated with a communication device having originated the emergency call;
- consulting a local database to obtain routing information associated with the directory number; and
- directing the call and the routing information over a path dedicated to emergency calls.

25. A computer-readable storage medium comprising computer-readable program code for execution by a computer in a network element upon receipt of an emergency call, the computer-readable program code comprising:
- computer-readable program code for determining a directory number associated with a communication device having originated an emergency call;
- computer-readable program code for consulting a local database to obtain routing information associated with the directory number; and
- computer-readable program code for directing the call and the routing information over a path dedicated to emergency calls.

* * * * *